US012624952B2

(12) United States Patent
Kim et al.

(10) Patent No.: US 12,624,952 B2
(45) Date of Patent: May 12, 2026

(54) IMAGE-BASED COOPERATIVE SIMULTANEOUS LOCALIZATION AND MAPPING SYSTEM AND METHOD

(71) Applicant: SEOUL NATIONAL UNIVERSITY R&DB FOUNDATION, Seoul (KR)

(72) Inventors: Hyoun Jin Kim, Seoul (KR); Young Seok Jang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 250 days.

(21) Appl. No.: 18/255,644

(22) PCT Filed: Mar. 16, 2021

(86) PCT No.: PCT/KR2021/003219
§ 371 (c)(1),
(2) Date: Jun. 2, 2023

(87) PCT Pub. No.: WO2022/119057
PCT Pub. Date: Jun. 9, 2022

(65) Prior Publication Data
US 2024/0118092 A1 Apr. 11, 2024

(30) Foreign Application Priority Data
Dec. 2, 2020 (KR) ........................ 10-2020-0166198

(51) Int. Cl.
*G01C 21/32* (2006.01)
*G01C 21/00* (2006.01)
*G06T 7/73* (2017.01)

(52) U.S. Cl.
CPC ......... *G01C 21/32* (2013.01); *G01C 21/3848* (2020.08); *G06T 7/73* (2017.01); *G06T 2207/30244* (2013.01)

(58) Field of Classification Search
CPC ........ G01C 21/32; G01C 21/3848; G06T 7/78
See application file for complete search history.

(56) References Cited

U.S. PATENT DOCUMENTS 9,699,375 B2 * 7/2017 Fan ...................... G06T 19/006
2008/0279421 A1 * 11/2008 Hamza ..................... G06T 7/70
382/103

(Continued)

FOREIGN PATENT DOCUMENTS

KR 10-2019-0094405 A 8/2019
KR 10-1976241 B1 8/2019
KR 10-2019-0114652 A 10/2019

OTHER PUBLICATIONS

Diluka Moratuwage et al., Collaborative Multi-Vehicle SLAM with Moving Object Tracking, 2013 IEEE International Conference on Robotics and Automation (ICRA), pp. 5702-5708, May 6-10, 2013.

(Continued)

*Primary Examiner* — Scott A Browne
*Assistant Examiner* — Izcalli Rios-Aguirre
(74) *Attorney, Agent, or Firm* — IP & T GROUP LLP

(57) ABSTRACT

An image-based cooperative simultaneous localization and mapping system and method by using rendezvous. The image-based cooperative simultaneous localization and mapping method in a multi-platform system preforms: estimating a camera posture on the basis of an image input through a camera in a single SLAM scheme and manufacturing an local map by each of multiple platforms; extracting a non-static feature from the image and managing same; transmitting, to a ground station, the camera posture, the local map, and the non-static feature as platform data; determining, by the ground station, whether a rendezvous situation has occurred between one of the multiple platforms and the remaining platforms, on the basis of the platform (Continued)

data; and when the rendezvous situation occurs, fusing the local map received from two or more rendezvoused platforms into a global map.

10 Claims, 15 Drawing Sheets

(56) References Cited

U.S. PATENT DOCUMENTS

| | | | | |
|---|---|---|---|---|
| 2013/0156327 | A1* | 6/2013 | Chandraker | G06F 18/24 |
| | | | | 382/203 |
| 2016/0025502 | A1* | 1/2016 | Lacaze | G01S 19/51 |
| | | | | 701/454 |
| 2021/0239472 | A1* | 8/2021 | Pajovic | B25J 9/1682 |

OTHER PUBLICATIONS

International Search Report and Written Opinion for the International Application No. PCT/KR2021/003219 issued by the International Searching Authority (Korean Patent Office) on Aug. 25, 2021.
Haoyao Chen et al., Localization for Multirobot Formationsn Indoor Environment, IEEE/ASME Transactions on Mechatronic, vol. 15, No. 4, pp. 561-574, Aug. 2010.

* cited by examiner

《Exp. IV》

Exp. I: (A~B)

Exp. II: (A~B)

Exp. III: (A~B), (A~C)

Exp. III: (A~B w/o C), (A~C w/o B)

Exp. IV: (A~B), (A~C)

Exp. IV: (A~B w/o C), (A~C w/o B)

IMAGE-BASED COOPERATIVE SIMULTANEOUS LOCALIZATION AND MAPPING SYSTEM AND METHOD

This application is a national stage application of PCT/KR2021/003219 filed on Mar. 16, 2021, which claims priority to Korean Patent Application No. 10-2020-0166198 filed on Dec. 2, 2020. The disclosure of each of the foregoing applications is incorporated herein by reference in its entirety.

FIELD OF INVENTION

The present invention relates to collaborative visual simultaneous localization and mapping (collaborative SLAM) system and method.

RELATED ARTS

In general, simultaneous localization and mapping (SLAM) refers to a technology that uses a single mobile platform or device to create a map of one's surroundings and estimate one's location within the map. SLAM is a key technology for autonomous vehicles and robots and for virtual reality (VR)/augmented reality (AR).

When multiple platforms are operated, a collaborative SLAM technology based on information exchange between platforms or terminals can be used to effectively map a large area while estimating the location of each of them.

However, for this single SLAM system in order to be extended to the collaborative SLAM for multiple platforms, a map fusion technology is required to integrate the information collected by each platform.

Map fusion requires either inter-robot loop detection, where platforms are looking at the same place, or rendezvous, where platforms appear in the field of view of other platforms and look at each other.

Existing rendezvous-based map fusion techniques have limitations such as using visual markers to confirm the identity of the observed robot (Korean Registered Patent No. 10-1976241) or requiring distance information from stereo cameras or RGB-D sensors.

SUMMARY

Technical Objectives

The present invention is intended to provide a collaborative visual simultaneous localization and mapping system and method that enable position estimation of multiple platforms or make an integrated map using a rendezvous situation in an environment in which multiple platforms such as autonomous vehicles, virtual/augmented/mixed reality terminals, and so on are operating.

The present invention is intended to provide a collaborative visual simultaneous localization and mapping system and method using rendezvous that does not use any markers or additional information to identify platforms, can solve the problem of rendezvous-based map fusion even with a lightweight and inexpensive monocular camera, and enables efficient collaborative SLAM using non-static features that are usually discarded.

Other advantages and objectives will be easily appreciated through description below.

Technical Solutions

According to one aspect of the present invention, there is provided a collaborative visual simultaneous localization and mapping method on a multiple platform system. The method includes estimating, by each of a plurality of platforms, a camera pose and generating a local map based on an image input through a camera in a single simultaneous localization and mapping (SLAM), extracting and managing a non-static feature from the image, transmitting the camera pose, the local map and the non-static feature as platform data to a ground station, which is an integrated management system, determining, by the ground station, based on the platform data, whether there is a rendezvous situation between one of the plurality of platforms and the remaining platforms and if there is the rendezvous situation, fusing the local maps received from the two or more platforms that have rendezvoused into a global map.

In one embodiment, the determining the rendezvous situation between one of the plurality of platforms and the remaining platforms includes, by identifying one platform as an observing platform, comparing a movement of the non-static feature in the image received from the observing platform with the motion of the remaining platforms based on the camera pose and the local maps received from the remaining platforms, wherein if there is a platform with similar movements above a threshold, it is assumed to be in the rendezvous situation with the observing platform, and the non-static feature is matched and utilized.

In one embodiment, the comparing a movement of the non-static feature in the image received from the observing platform with the motion of the remaining platforms based on the camera pose and the local maps received from the remaining platforms includes designing an optimization problem and determining that the non-static feature is an observation value that points to the platform when a convergence error of the optimization problem is small enough.

In one embodiment, the comparing a movement of the non-static feature in the image received from the observing platform with the motion of the remaining platforms based on the camera pose and the local maps received from the remaining platforms includes finding a convergence solution for the optimization problem by using an alternating minimization algorithm In one embodiment, the comparing a movement of the non-static feature in the image received from the observing platform with the motion of the remaining platforms based on the camera pose and the local maps received from the remaining platforms includes map fusing, by a map fusion module, by using the feature the local maps and the pose data for the camera pose, both generated by the observing platform and the observed platform into a global map.

In one embodiment, the comparing a movement of the non-static feature in the image received from the observing platform with the motion of the remaining platforms based on the camera pose and the local maps received from the remaining platforms includes estimating a similarity transformation value between the local maps to fuse into the global map.

According to another aspect of the present invention, there is provided a collaborative visual simultaneous localization and mapping system in which each of a plurality of platforms estimates a camera pose and generating a local map based on an image input through a camera in a single simultaneous localization and mapping (SLAM). The system includes a ground station configured for receiving a platform data from each of a plurality of platforms, analyzing the platform data and generating a global map, wherein the ground station includes a platform matching module configured for receiving the platform data from each of the plurality of platforms and determining, based on the platform data, whether there is a rendezvous situation between one of the plurality of platforms and the remaining platforms and a map fusion module configured for fusing the local maps received from the two or more platforms that have rendezvoused into a global map if there is the rendezvous situation.

In one embodiment, each of the plurality of platforms extracts and manages a non-static feature from the image, wherein the platform data comprises the camera pose, the local map and the non-static feature.

In one embodiment, the platform matching module identifies one platform as an observing platform, compares a movement of the non-static feature in the image received from the observing platform with the motion of the remaining platforms based on the camera pose and the local maps received from the remaining platforms, and if there is a platform with similar movements above a threshold, it is assuming to be in the rendezvous situation with the observing platform, matches the non-static feature.

In one embodiment, the platform matching module is configured for designing an optimization problem and determining that the non-static feature is an observation value that points to the platform when a convergence error of the optimization problem is small enough.

In one embodiment, the map fusion module is configured for estimating a similarity transformation value between the local maps that are generated by the observing platform and the observed platform by using the non-static feature to fuse into the global map.

According to still another aspect of the present invention, there is provided a platform for performing localization and mapping on the move. The platform includes an image input unit configured for receiving an image of surrounding captured by a camera, a camera pose estimation unit configured for extracting and matching a feature from the image, and estimating a camera pose from the matched feature, a local map generation unit configured for generating the local map of an area in which the platform is located and traveled based on the image and the camera pose, a non-static feature management unit for extracting and managing the non-static feature among the features and a communication unit configured for transmitting platform data including the camera pose, the local map and the non-static feature to the ground station.

In one embodiment, the image has successive frames, wherein the non-static feature management unit tracks and manages them in the image in successive frames.

Any other aspects, features, and advantages will be more clearly understood from the following detailed description taken in conjunction with the accompanying drawings and claims.

Effects of Invention

According to one embodiments of the present invention, in an environment in which multiple platforms such as autonomous vehicles, virtual/augmented/mixed reality terminals, and so on are operating, the rendezvous situation can be used to estimate the position of multiple platforms and make an integrated map.

In addition, it does not use any markers to identify platforms, can solve the problem of rendezvous-based map fusion with a monocular camera, and enables efficient collaborative SLAM by using non-static features that are usually discarded.

BRIEF DESCRIPTION OF ACCOMPANYING DRAWINGS

FIG. 5 is a framework for collaborative visual simultaneous localization and mapping system using rendezvous according to one embodiment of the present invention;

Figure 13:
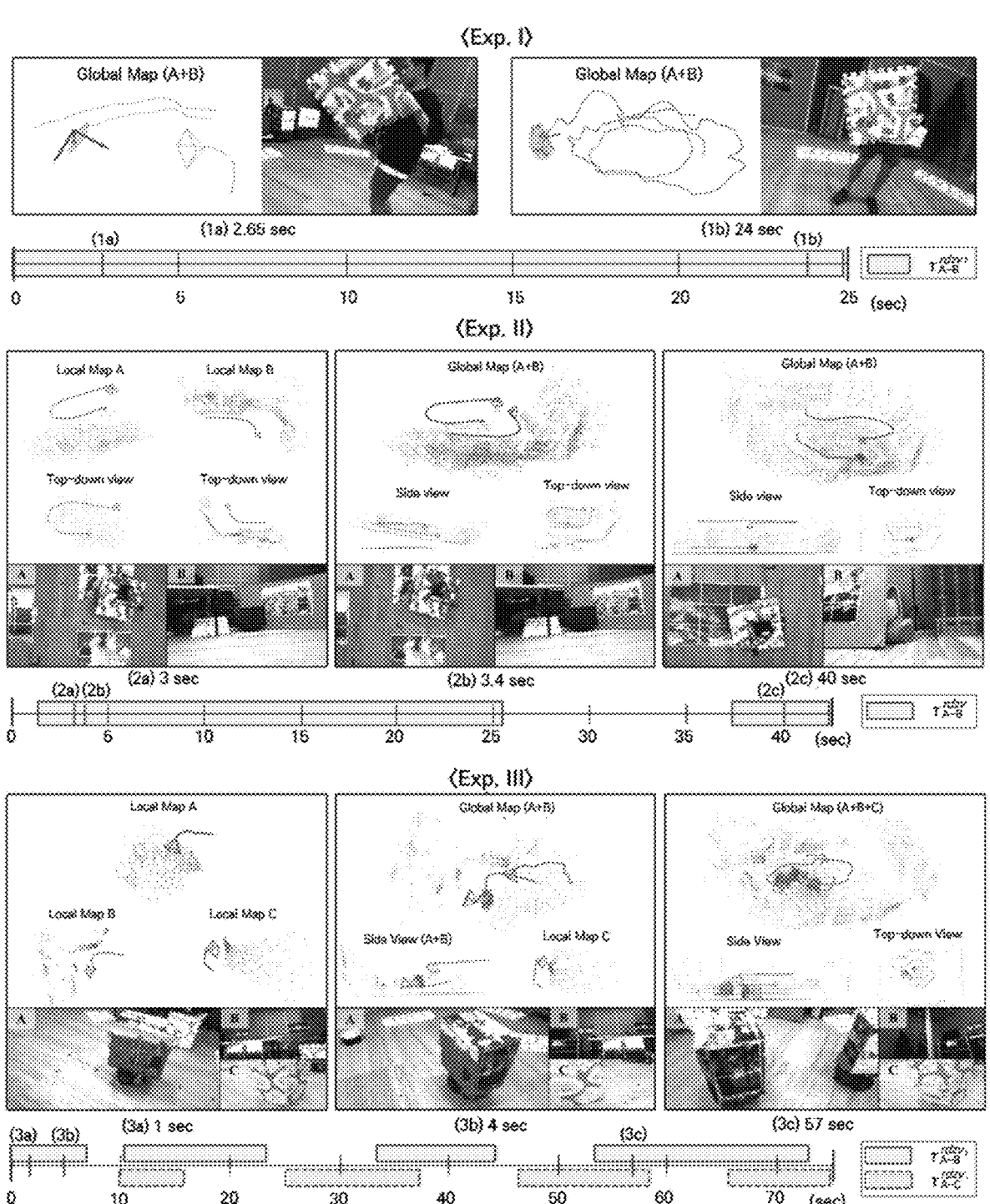
Figure 15:
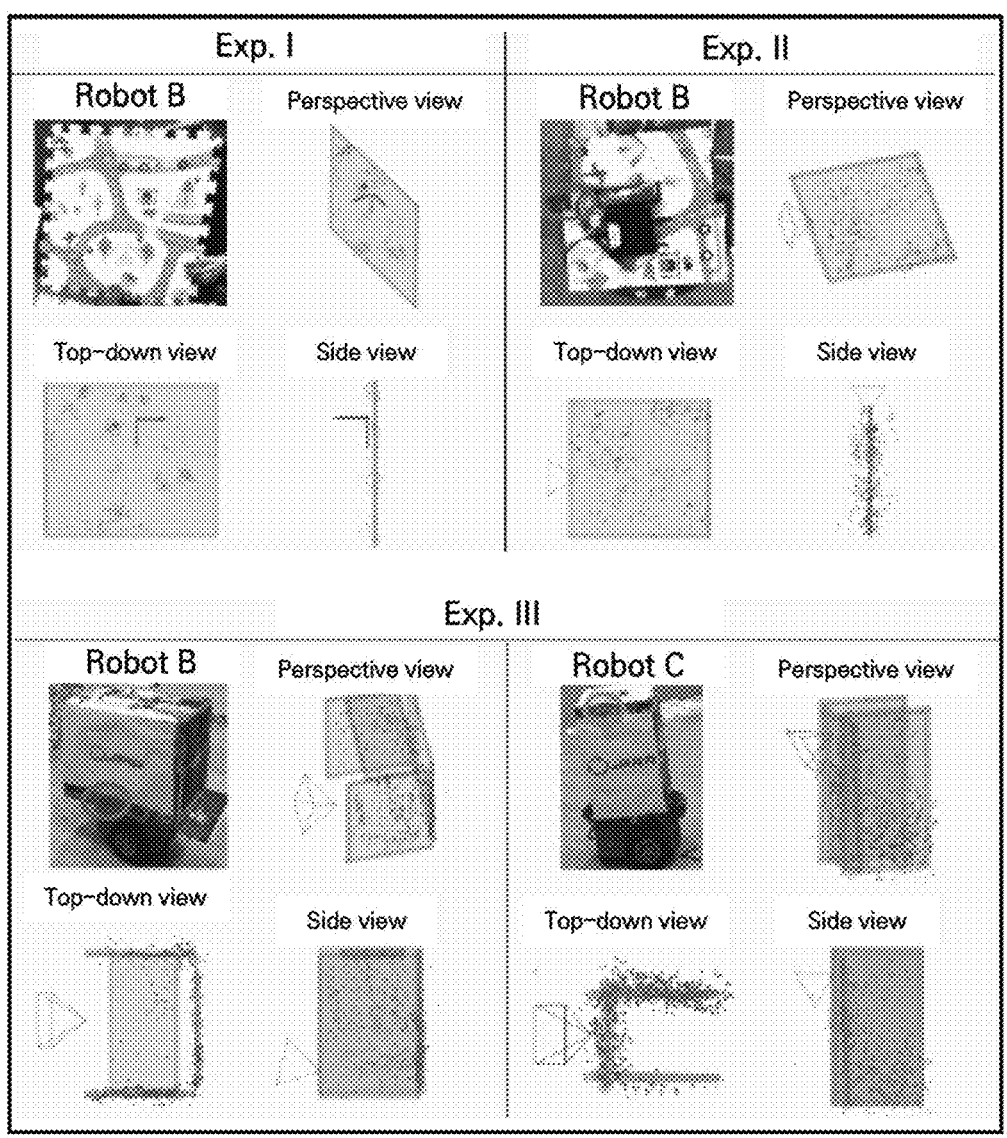
Figure 16:
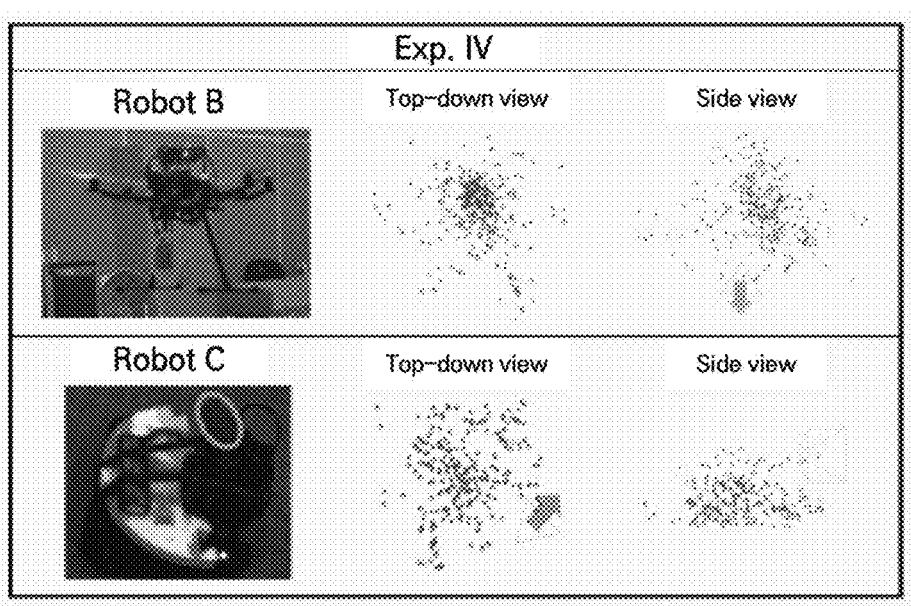
Figure 17:
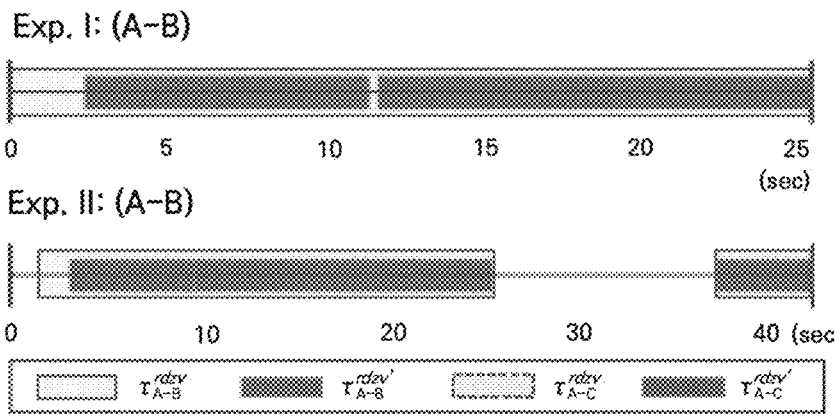
Figure 17:
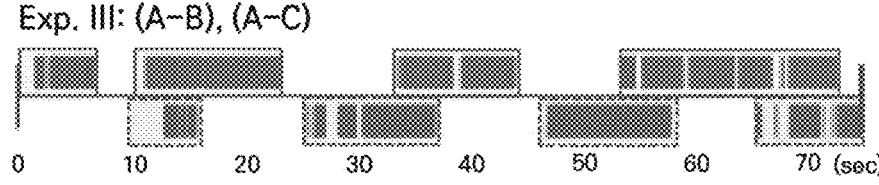
Figure 17:
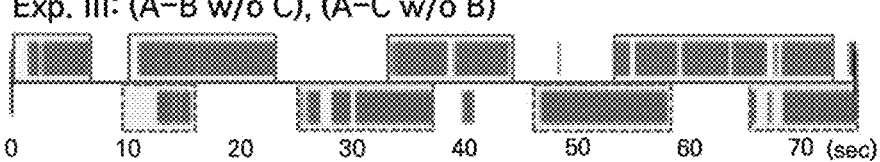
Figure 17:
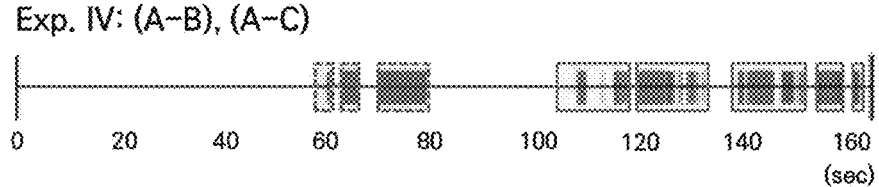
Figure 17:
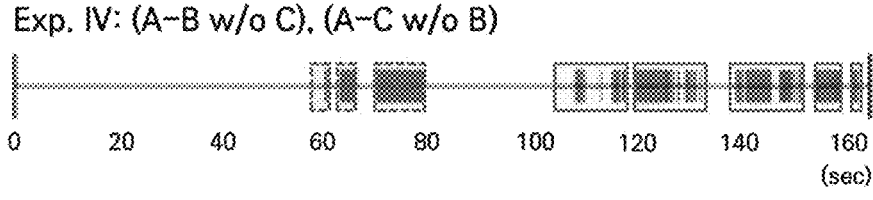

FIG. 13 shows results of the collaborative monocular SLAM at specific time instants in experiments 1, 2 and 3 (red, blue, and green colors represent the platforms A, B, and C, respectively. In the map, the cyan and green ellipsoids in the map figures are the estimated volume of the platforms B and C, respectively. Images of platforms A, B, and C include NSF and features of B and C);

Figure 14:
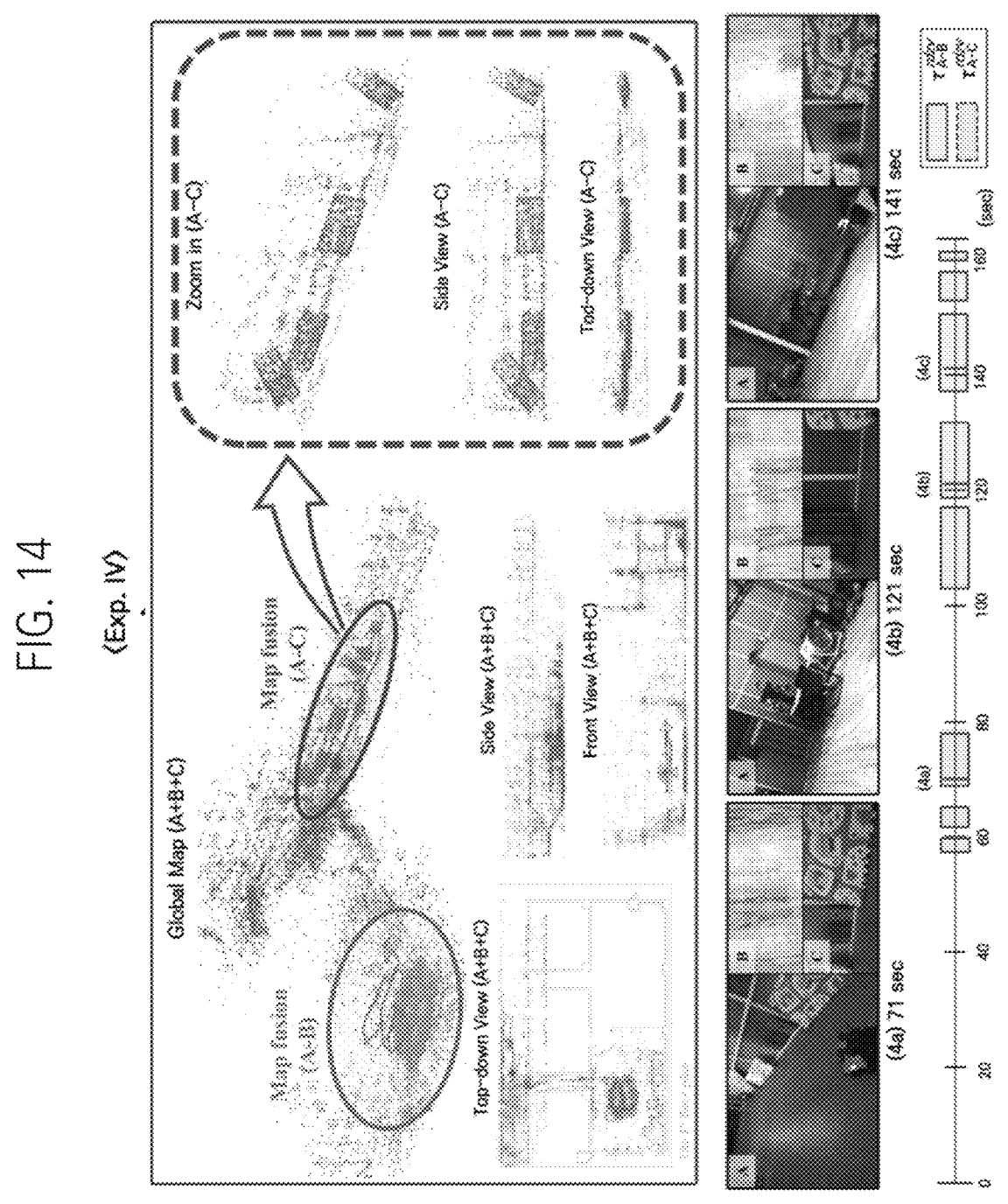

FIG. 14 shows results of the FI and MF modules in Experiment 4 (red, blue, and green colors represent the platforms A, B, and C, respectively. In the map, the cyan and green ellipsoids in the map figures are the estimated volume of the platforms B and C, respectively. Images of platforms A, B, and C include NSF and features of B and C);

FIG. 15 shows results of fitting planes to the estimated inner points in Experiments 1-3 (blue and green colors represent onboard cameras);

FIG. 16 shows inner points of platforms B and C estimated in Experiment 4 (blue and green colors represent onboard cameras, with their orientation indicated by the arrows); and FIG. 17 shows actual and recognized rendezvous periods (the darker color is the actual rendezvous point, and the thinner, clearer color is the perceived rendezvous point).

DETAILED DESCRIPTION

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Terms such as ~part, ~unit, ~module mean an element configured for performing a function or an operation. This can be implemented in hardware, software or combination thereof.

Figure 1:
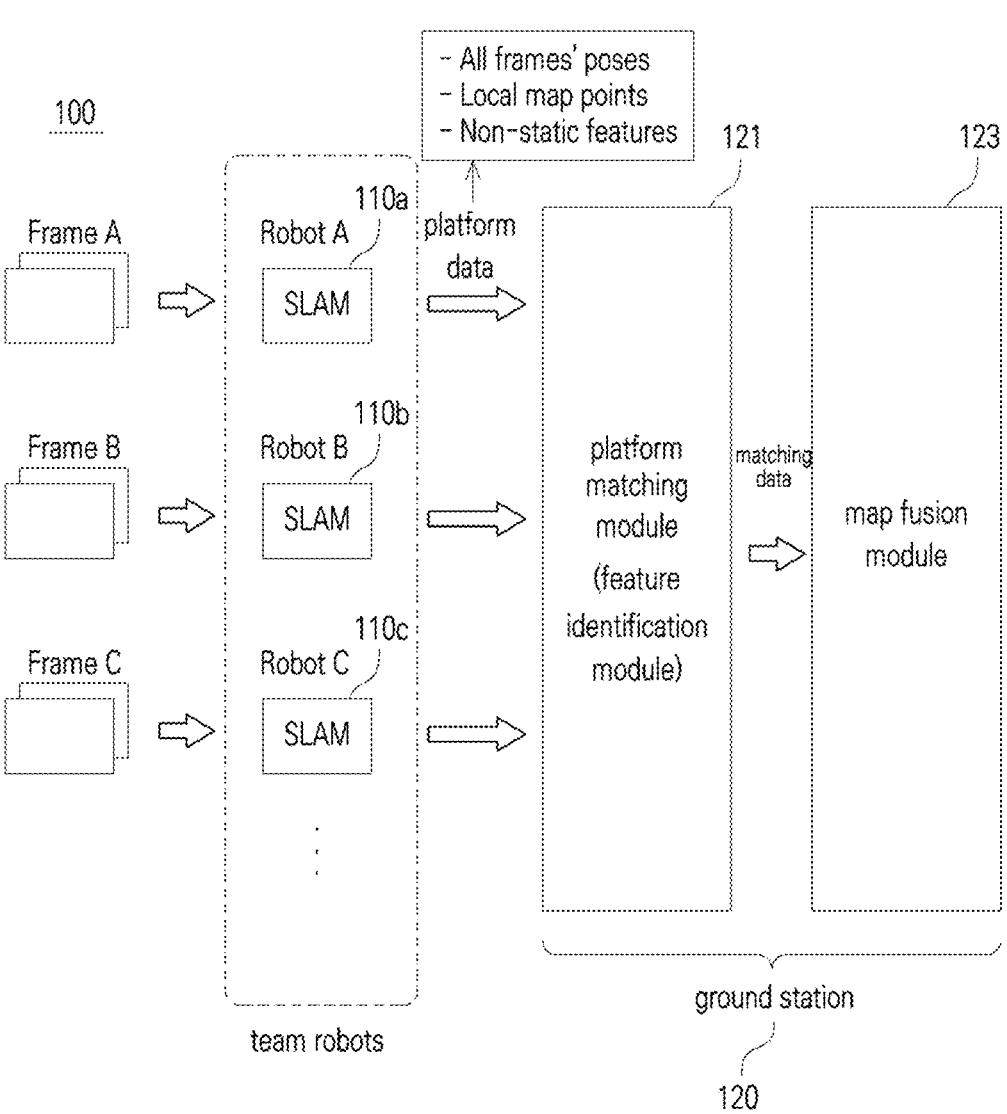
FIG. 1 is a block diagram illustrating a configuration of a collaborative visual simultaneous localization and mapping system using rendezvous according to one embodiment of the present invention.
Figure 2:
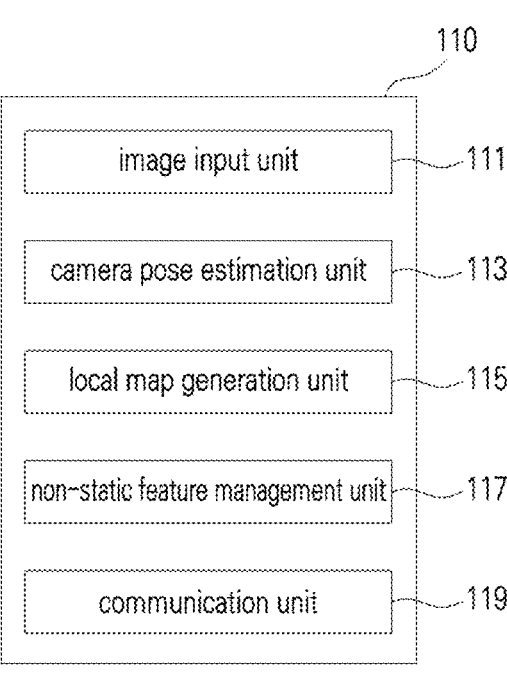
FIG. 2 is a block diagram of a configuration of any platform included in the collaborative visual simultaneous localization and mapping system using rendezvous according to one embodiment of the present invention.
Figure 3:
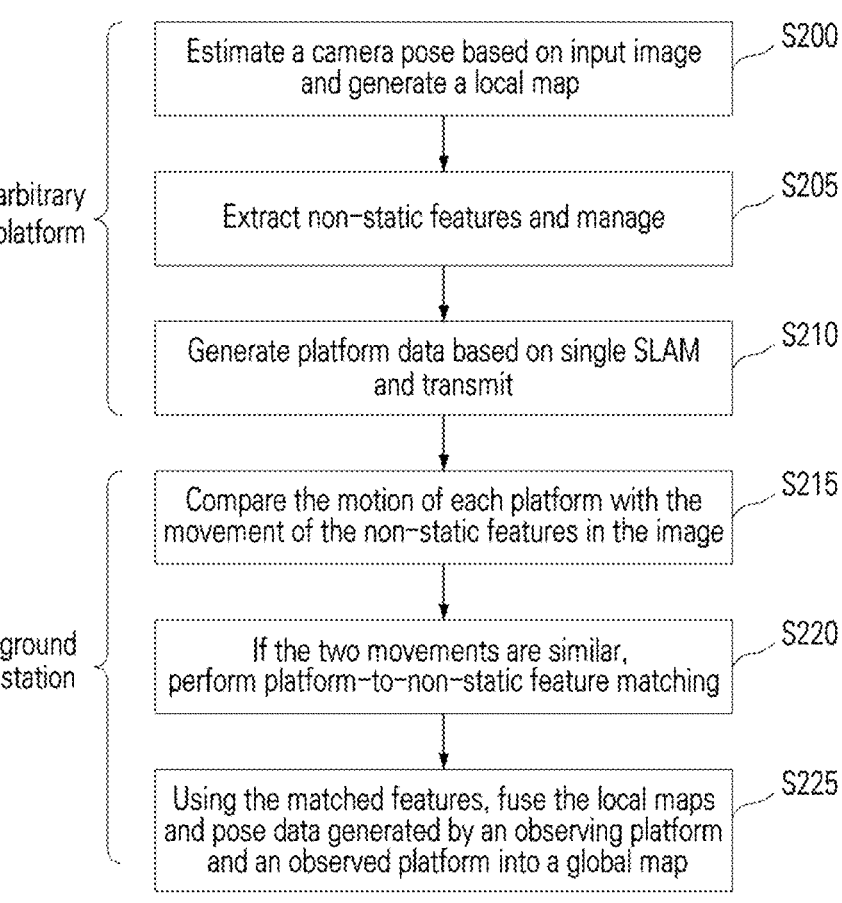
FIG. 3 is a flowchart of a collaborative visual simultaneous localization and mapping method using rendezvous according to one embodiment of the present invention.

FIG. 1 is a block diagram illustrating a configuration of a collaborative visual simultaneous localization and mapping system using rendezvous according to one embodiment of the present invention, FIG. 2 is a block diagram of a configuration of any platform included in the collaborative visual simultaneous localization and mapping system using rendezvous according to one embodiment of the present invention, and FIG. 3 is a flowchart of a collaborative visual simultaneous localization and mapping method using rendezvous according to one embodiment of the present invention.

The collaborative visual simultaneous localization and mapping (collaborative SLAM) system and method using rendezvous according to one embodiment of the present invention is characterized by the fact that each platform can identify the platform and recognize the rendezvous without using additional sensors or markers to enable efficient cooperative SLAM In multi-platform systems that can efficiently perform complex tasks such as cooperative exploration, transportation, and surveillance, i.e., in arbitrary environments where platforms such as multi-platform or autonomous vehicles operate.

Referring to FIG. 1, the collaborative SLAM system 100 using rendezvous according to one embodiment may include a plurality of platforms 110a, 110b, 110c (hereinafter referred to collectively as "110") belonging to the same team (or a single platform), and a ground station 120 that utilizes data produced by the platforms 110 to perform platform matching and map fusion.

The multi-platform, having a plurality of platforms 110, may perform missions (i.e., missions requiring movement) such as autonomous driving, transportation, and security surveillance in an arbitrary environment. The platforms 110 may be devices that have mobile characteristics, such as robots, drones, autonomous vehicles, and the like.

In a multi-platform system, the robustness of the platform slam may be required because the other platforms are moving objects, and there are direct and indirect approaches.

Direct approaches can yield highly accurate pose estimation by nonlinear optimization that minimizes the difference of intensities between two images.

Indirect approaches can use features tracked in a series of images to estimate the poses through a 3-D geometry-based bundle adjustment (BA). Since the indirect approaches may be reliable even when a large portion of the image is dynamic pixels, and furthermore, map data consisting of reconstructed static features are suitable for communication to the server because of the sparsity of map points, the indirect approaches may be applied in one embodiment.

In an environment where multiple platforms are operating, an interloop detection or rendezvous situation may be required to integrate the information acquired by each platform.

In the case of map fusion using the interloop detection, it is difficult to apply in environments where the viewpoints of cameras mounted multiple platforms are different or where there are many similar scenes.

Figure 4:
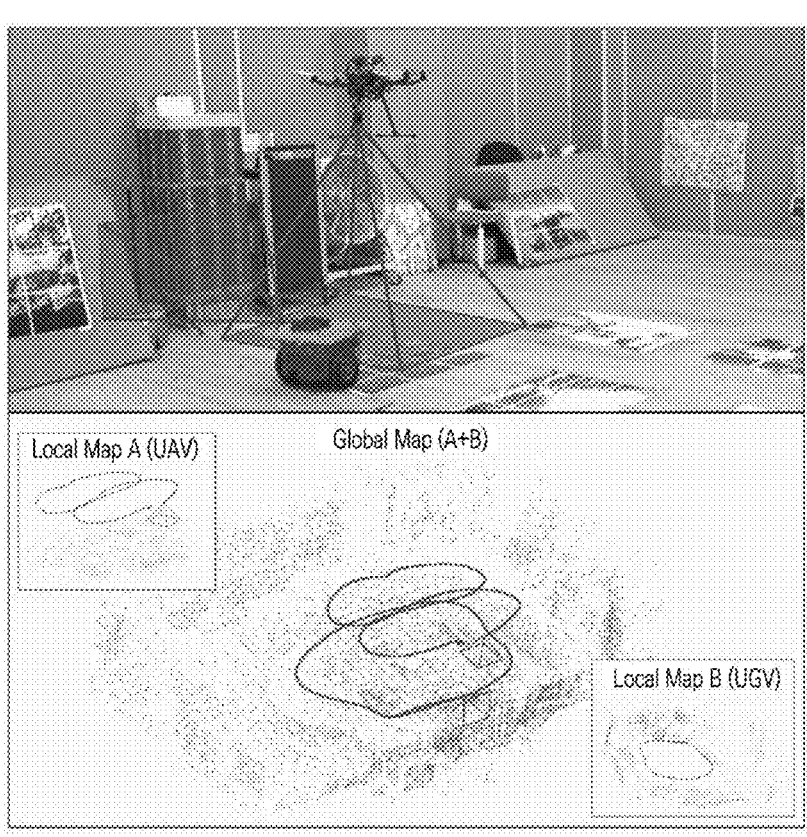
FIG. 4 illustrates map fusion using platform rendezvous.

Referring to FIG. 4, map fusion using rendezvous is illustrated. The top figure shows the viewing areas of monocular cameras mounted on an unmanned aerial vehicle (UAV) and an unmanned ground vehicle (UGV) in a rendezvous situation. The UAV's camera is a top view and the UGV's camera is a front view. As seen, if the top view of a drone (UAV) is different from the front view of a ground platform (UGV), it can be difficult to observe the same place. Even if it is observed, the cameras' viewpoints are different, so the values of the descriptors that numerically represent each scene are different, making it impossible to detect interloops between platforms.

Rendezvous situations, where a member of a platform is observed in the image of another member, are less affected by these limitations. Therefore, one embodiment utilizes a rendezvous situation (where one platform is visible on another platform's image) to perform map fusion. This allows the platforms to operate in a wider variety of environments without being subject to hardware configuration and environmental limitations.

The ground station 120 communicates with the plurality of platforms 110 and fuses the local maps created by the platforms 110 to create a global map. This is a result of the framework's design for computing power.

The global map produced by the ground station 120 can be transmitted to the platform 110 for use by the platform 110.

Referring to FIG. 2, an arbitrary platform 110 may include an image input unit 111, a camera pose estimation unit 113, a local map generation unit 115, a non-static feature management unit 117, and a communication unit 119.

The image input unit 111 is installed at a preset location (e.g., the front) of each platform 110 to acquire an image of the surroundings. The image may be continuous video data.

In one embodiment, the image input 111 may be a monocular camera. If it is a stereo camera or RGB-D sensor, depth information can also be acquired, but this has the limitation of requiring additional configuration and increasing cost. In comparison, one embodiment enables map fusion to be performed by identifying platforms and recognizing rendezvous situations even when using a typical monocular camera that only acquires images without depth information. Of course, in addition to monocular cameras, stereo cameras, RGB-D sensors, laser-type measurement equipment, and the like may be utilized as image inputs 111 depending on the situation. For ease of understanding and description of the invention, this specification will assume that a monocular camera is used as the image input 111.

The camera pose estimation unit 113 extracts and matches features for the image obtained from the image input 111, and estimates a camera pose from the matched features.

The camera pose estimation unit 113 estimates the relative pose of the camera to a static portion of the image. For example, an algorithm based on an outlier removal algorithm, RANdom SAmple Consensus (RANSAC), can be used to filter out only static features from the matched features. Such RANSAC algorithms for camera pose estimation are well-known to those of ordinary skill in the art to which the present invention belongs and will not be described in detail.

The local map generation unit 115 generates a local map of the area in which the platform 110 is located and traveled based on the image obtained from the image input unit 111 and the camera pose estimated by the camera pose estimation unit 113. Generation of the local maps may be performed via a single SLAM technique, which is well-known to a person of ordinary skill in the art to which the present invention belongs and will not be described in detail.

The non-static feature management unit 117 extracts non-static features that would normally be discarded by RANSAC as outliers among the matched features, and tracks and manages them in the image in successive frames.

In one embodiment, non-static features are features created by dynamic objects in the image. In an environment with multiple platforms, all other platforms are considered dynamic objects. Therefore, in the rendezvous situation, some of the non-static features can provide useful information about other platforms.

These extracted features can then be managed across successive images with Kanada-Lucas Tomasi (KLT) or other tracking and matching algorithms.

The communication unit 119 is networked with the ground station 120, which assigns and manages missions to the platforms, to send and receive various data.

The communication unit 119 transmits platform data to the ground station 120, including camera poses (APs), local map points (MPs), and non-static features (NSFs) in all image frames created by the platform 110. Transmission of the platform data may occur at preset intervals or upon request from the ground station 120.

The ground station 120 includes a platform matching module 121 and a map fusion module 123.

Additionally, the ground station 120 may include a storage unit (not shown) for storing platform data transmitted from the platform 110. The storage unit may include a Local Map Stack for storing local maps, and a non-static features stack for storing non-static features. The storage unit may further include a team-features stack for storing features that are the result of matching in the platform matching module 121, and a global map stack for storing a global map generated by the map fusion module 123.

The platform matching module 121 distinguishes whether non-static characteristics in the platform data transmitted from the platforms 110 are related to other platforms belonging to the same team, and matches them.

Non-static features include all non-static features without distinction. As such, they are anonymous observation values that do not indicate whether they were extracted from a dynamic obstacle or from a platform belonging to the same team.

In order to recognize the rendezvous situation, it is necessary to be able to identify the observing platform and the observed platform, and to distinguish which platform is indicated by the non-static feature, which is an anonymous observation value.

If there are platform motions in the image that are similar to the movements of the non-static feature, the non-static feature can be seen to be extracted from a platform with high motion similarity. Such non-static features may include relative pose measurement values between platforms in a rendezvous situation.

Therefore, the platform matching module 121 can design and solve an optimization problem that compares the pose of the platforms estimated from a single SLAM to the movement of the non-static features in the image. This is essentially a non-convex optimization problem, but the actual computation can vary. When the convergence error of the corresponding optimization problem is small enough, it can say that a non-static feature is an observation that points to a platform, in which case platform-non-static feature matching can be performed. The non-static features that are successfully matched to a platform can be categorized as team-features.

The map fusion module 123 uses the features to fuse the data acquired by the observing platform and the observed platform, in particular, their respective local maps, into the global map.

In order to fuse the local maps generated by each platform into a single global map, information representing the three-dimensional relative nature of the local maps (e.g., similarity transformation) is estimated.

In one embodiment, map fusion is performed by estimating a similarity transformation value between the local maps using a feature that is a bearing vector for the observed platform as viewed by the observing platform.

Referring to FIG. 3, the collaborative SLAM method using rendezvous according to one embodiment is as follows.

All of the platforms 110 individually perform a single SLAM system and generate camera poses and local maps (step S200).

In addition, non-static features discarded in the single SLAM are extracted, tracked, and managed in successive images (step S205).

Platform data, including camera poses, local maps, and non-static features are transmitted to the ground station (step S210).

The platform matching module 121 compares the motion of each platform estimated from the SLAM with the movement of the non-static features in the image (step S215).

If the two movements are similar, platform-to-non-static feature matching is performed (step S220).

An optimization problem can be designed for motion similarity comparison to effectively perform the comparison task. The solution can be found quickly and robustly using alternating minimization algorithms (AMs) or other numerical techniques that approximate the original non-convex optimization problem.

Successfully matched non-static features are no longer anonymous observation values but can be used as verified observation values, and the map fusion module 123 performs map fusion when a certain amount of platform-to-feature matching data is collected (step S225).

Using the matched non-static features, the local maps and pose data generated by the observing platform and the observed platform are fused into the global map, and for map fusion, the similarity transformation value between the local maps can be estimated.

The collaborative SLAM system and method using rendezvous according to one embodiment can be applied in environments where cameras mounted on platforms have different viewpoints or where there are many similar scenes because, unlike conventional collaborative SLAM systems, it uses the rendezvous situation to perform map fusion. In addition, platform matching can be performed using non-static features extracted from monocular cameras without using any markers or additional sensors for platform identification. As a result, the collaborative SLAM system can be realized with a lightweight and inexpensive sensor configuration that is more easily adapted to multi-platform systems.

The automation market for mobile platforms utilizing multi-platforms according to one embodiment can be extended to industries for human convenience such as multiple vehicles, factory automation systems, unmanned delivery systems, remote reconnaissance, surveillance, facility inspection, information platforms, personal services, etc. In particular, multiple unmanned aerial vehicles can be used in various fields such as flying taxis, unmanned delivery, drone shows, and industrial environment inspection in dangerous areas.

The collaborative SLAM method according to one embodiment does not require inter-sensor calibration technology because it can also use an inexpensive monocular camera, and is very easy to apply to unmanned aerial vehicles or unmanned vehicles, platforms, airplanes, AR/VR/MR terminals, etc. that have limitations on payload price, payload space, and weight.

In one embodiment, a novel rendezvous-based map fusion technique using non-static features is proposed. Most SLAM algorithms use only static features and discard mismatched features or non-static features consisting of dynamic obstacles or features extracted from different platforms as outliers. However, non-static features may contain useful information, such as inter-platform measurements in multi-platform systems, and in one embodiment, non-static features can be easily extracted from the conventional SLAM without additional processes for inter-platform observations, thereby improving overall efficiency.

Furthermore, one embodiment does not use specialized visual tags or additional sensors such as inertial measurement units (IMUs) or motion capture systems, but only anonymous pose measurement data from monocular cameras, which may improve its applicability in general multi-platform systems.

Furthermore, one embodiment divides the total optimization variables into two subsets through an efficient alternating minimization algorithm, solving for one subset and fixing the other, so that the original optimization problem can be solved by iteratively alternating between the two subproblems with a closed-form solution.

In the following, the collaborative SLAM system and method using rendezvous according to one embodiment will be described, including the algorithms applied to each module and experimental results.

In challenging situations where platforms do not know their relative pose and no special visual tags are available, the full framework of a collaborative monocular SLAM and the method to integrate local maps of platforms into a global map using rendezvous are provided according to one embodiment. The similarity transform SIM(3) between local maps, which are based on the initial pose of each platform and the individual scale determined by the initialization module of platform SLAM, should be estimated for MF. Estimating of SIM(3) {R, t, s} between local maps is equal to compute the platform-to-platform initial relative pose SE(3) {R, t} and the ratio of scale {s}.

The observable platform may be defined as all platforms except the observer platform, that is, platforms that can be observed. If the movement of a non-static feature (NSF) from the observer platform is very similar to the motion of the observable platform, NSFs are considered team-features and the observable platform becomes the observed platform. In this case, the relative SIM(3) between the local maps from the observer platform and the observed platform should be estimated to integrate local maps into a global map using features that are considered as identified relative measurements.

The overall framework is as follows.

Figure 5:
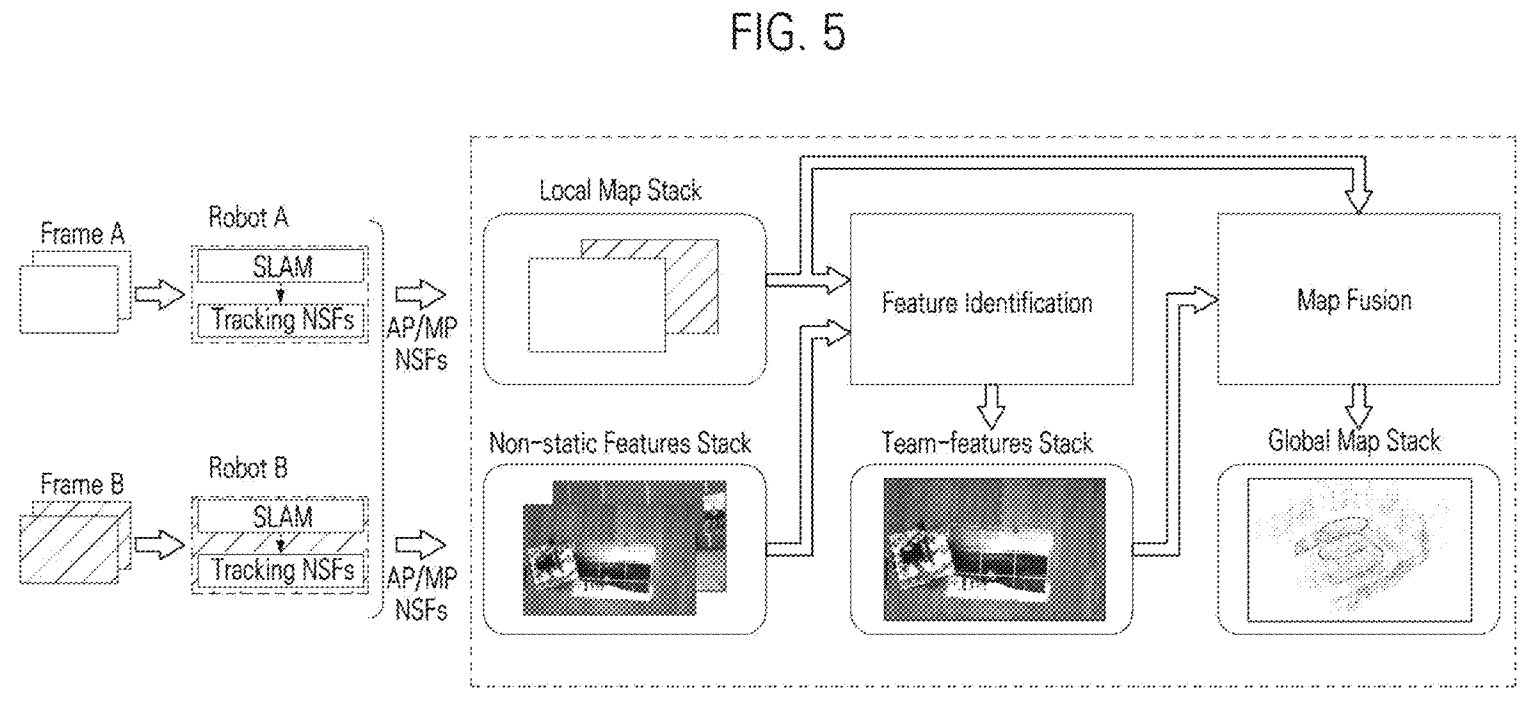

The architecture according to one embodiment is shown in FIG. 5. To simplify the explanation, a 2-platform case is described and can be easily extended to more platforms. Platform SLAM can use any feature-based SLAM algorithm. In one embodiment, ORB-SLAM2, which is one of the best feature-based SLAM, is exploited. Each platform tracks NSFs and estimates a local map and its own pose. These data are collected in the ground station via a wireless network, in the centralized setup used. The local map stack manages the gathered SLAM data such as map points (MPs) and all frames' poses (APs), which are the poses of all images captured by each platform. The NSFs received from platforms are stored in the NSFs stack. The FI module accesses the stack databases so as to recognize a rendezvous. If features connected to certain two platforms are gathered enough, the map fusion module makes a global map.

The collected data is time-consistent.

The ground station receives and manages the local maps and NSFs estimated by the platforms as mentioned above. In one embodiment, the platform operating system (ROS) is used for communication, and all communicated data have the ROS time stamp, which is used as the reference time. The FI module requires the APs and NSFs of the observer platform and the APs of observable platforms, and these data should be time-synchronized. When platform A is the observer platform, the APs and NSFs received from the platform A have the ROS time frames of A at which these data are extracted. Therefore, the APs of observable platforms should be time-synchronized to the frames of A, which requires the compensation about the time gap between the frames of the platform A and observable platforms. The time-synchronized APs of the observable platforms can be computed by interpolation under the assumption that the velocity between two consecutive frames is constant.

Next, the platform module (corresponding to platform 110 in FIG. 2) that runs on each platform to construct a collaborative monocular slam is described. For each platform to transmit APs, MPs, and NSFs to the ground station, each platform uses a feature-based SLAM modified to extract and manage NSFs.

In feature-based monocular SLAM, there is the initialization module, which creates an initial local map using 2-D-to-2-D corresponding features based on the initial pose of each platform and determines the reference scale. Once the initial local map has been created, the localization in the local map and mapping of the new static features are repeated each time when the frame is captured. The estimated poses and MPs are refined by a bundle adjustment (BA), and the target frames of the refinement process are only key frames, not all the frames. In the multiple platform SLAM framework according to one embodiment, which needs APs, the poses of frames between the refined key frames are updated each time when the key frames poses are refined through BA. Platform SLAM uses a pose correction algorithm for the pose correction of the relative frames between key frames. Then, the updated APs and MPs are transmitted to the ground station.

For the extraction and management of NSFs, the feature-based SLAM is modified as follows. NSFs consist of mismatching features and dynamic features that do not support ego-motion as described above. All the extracted NSFs are tracked in consecutive images by the Kanade-Lucas-Tomasi (KLT) feature tracker. The descriptors of the NSFs that have been successfully tracked in more images than a batch size parameter $N_{bs}$ are calculated and compared with the reference descriptors computed when the NSFs were first extracted. This descriptor comparison between images as far away as $N_{bs}$ steps, not just two consecutive images, helps to remove most of the mismatched features. The NSFs that have been matched successfully can be considered as features on dynamic objects and are stored in the database for NSFs (DBNSF).

Furthermore, the extracted NSFs are compared to the descriptors in DBNSF to check if the same features exist in DBNSF. This process is similar to the relocalization of feature-based SLAM and helps to recognize re-rendezvous, which means that a platform went out of the image and reappears. Among the NSFs in DBNSF, NSFs whose tracking length is a multiple of $N_{bs}$ are transmitted to the ground station to manage the communication load. This condition will be referred as the batch size condition. The algorithm regarding the management of NSFs is described in Algorithm 1, where NSFs and NSFs,vref are the extracted NSFs in the current image and their reference descriptors. prev_tNSFs and tNSFs denote the tracked NSFs until the previous and current images, respectively.

| Algorithm I Management of non-static features |
| --- |
| 1:      Input: image, NSFs, prev_tNSFs, $DB_{NSF}$ |
| 2: |
| 3:      % Recognition of re-rendezvous |
| 4:      if checkRe-rendezvous(NSFs.$v_{ref}$, $DB_{NSF}$) then |
| 5:         % Re-rendezvous |
| 6:         tNSFs ← (NSFs, matched features in $DB_{NSF}$} |
| 7:      else |
| 8:         tNSFs ← NSFs |
| 9:      end if |
| 10: |
| 11:      % Management of tracked non-static features |
| 12:      tNSFs ← KLT(image, prev_tNSFs) |
| 13:      if checkBatchSize(tNSFs, $N_{bs}$) then |
| 14:         % Satisfied |
| 15:         tNSFs.$v_{curr}$ ← computeDescriptor(image, tNSFs) |
| 16:         if checkMatching(tNSFs.$v_{curr}$, tNSFs.$v_{ref}$) then |
| 17:            % Matched |
| 18:            updateDB(tNSFs, $DB_{NSF}$) |
| 19:            sendToGroundStation(tNSFs) |
| 20:         else |
| 21:            discardFromDB(tNSFs, $DB_{NSF}$) |
| 22:         end if |
| 23:      else |
| 24:         updateDB(tNSFs, $DB_{NSF}$) |
| 25:      end if |
| 26: |
| 27:      Output: tNSFs, $DB_{NSF}$. |

It will be described that how the ground station, specifically the platform matching module (FI module), recognizes the rendezvous and utilizes the rendezvous to integrate the local maps into the global map. The FI module compares the AP and NSF of the observer platform with the AP of the observable platform to determine if there are features in the NSF that point to the platform; if so, the NSF is considered a feature that can provide an identified relative measurement.

The optimization problem to identify a platform that matches NSFs as an error minimization associated with edges of a graph is formulated, the management of the graph edges is explained, and the original nonconvex optimization problem as two subproblems with closed-form solutions is reformulated. The initial value of the optimization and the criteria of the features are described.

In the following, to simplify the notation, it will be described that the MF problem for two platforms, denoting the observer platform that observes NSFs and the observable platforms as A and B, respectively. All platforms are assumed to be rigid bodies.

Figure 6:
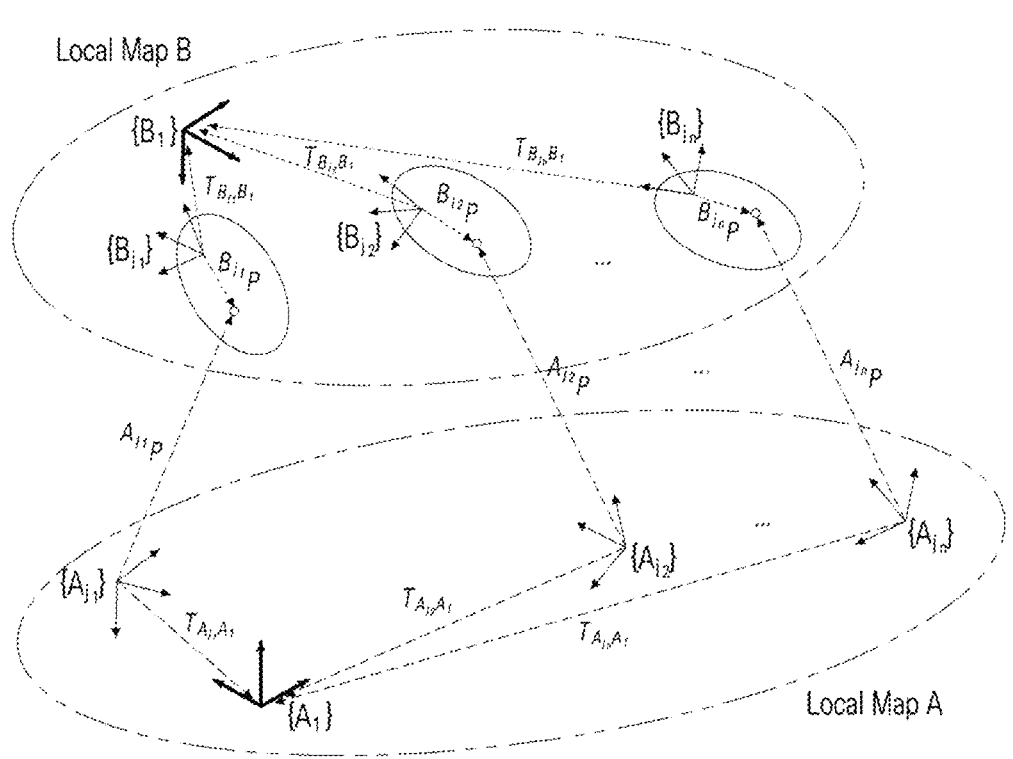
FIG. 6 is a representative coordinates of two platforms during tracking of non-static feature.

FIG. 6 is a diagram of the representative coordinate systems of the two platforms while tracking the NSF.

The reference coordinates of each local map are the initial poses {A1}, {B1} of each platform. The feature P observed by platform A points to platform B.

A. Formulation of Feature Identification Problem

The camera coordinates of the platforms A and B at time j are denoted by {Aj} and {Bj}, respectively. The APs of each platform are expressed based on its initial pose {A1} and {B1}.

The platform A observes the feature $A_jP=[^{A_j}X, ^{A_j}Y, ^{A_j}Z]^T$ at time j, expressed in the {Aj} frame.

The normalized coordinates of the feature are denoted as $$^{A_j}\overline{P} = \frac{1}{^{A_j}Z}{}^{A_j}P.$$

The time instants at which features are tracked are collected as $J=\{j_1, \ldots, j_n\}$, and $j\in J$ is treated as a node in graph representation. Under the rigid-body assumption, the 3-D positions of features in the inner part of B represented with respect to {Bj} are time-invariant, i.e., $$^{B}P = {}^{B_j}P \text{ where } j\in J.$$

The point coordinates are related by $$^{A_j}P=R_{A_jB_j}{}^{B_j}P+t_{A_jB_j}=R_{A_jB_j}{}^{B}P+t_{A_jb_j} \tag{1}$$

where $R_{A_jB_j}$ and $t_{A_jB_j}$ represent the relative rotation and translation between {Aj} and {Bj}, respectively.

The translation $t_{A_jB_j}$ can be derived as $$t_{A_jB_j}={}^{A_j}P-R_{A_jB_j}{}^{B}P. \tag{2}$$

The edge constraint between two nodes $j_1$ and $j_2$ using the loop through $\{A_{j1}\}$, $\{A_{j2}\}$, $\{B_{j2}\}$ and $\{B_{j1}\}$ may be defined as follows:

$$R_{A_1A_{j_1}}t_{A_{j_1}A_{j_2}} + R_{A_1A_{j_2}}t_{A_{j_2}B_{j_2}} - R_{A_1B_{j_1}}\left[t_{B_{j_1}B_{j_2}} - t_{B_{j_1}A_{j_1}}\right] = 0, \tag{3}$$

$$x_{j_1 j_2} = \left\{w_{A_1B_1}^T, {}^{B}P^T, s_{AB}, {}^{A_{j1}}Z, {}^{A_{j2}}Z\right\}^T \in \mathbb{R}^9$$

$$w_{A_1B_1} = \log_{so(3)}\left(R_{A_1B_1}\right) \in so(3).$$

where the vector $x_{j_1 j_2}$ contains the unknown variables such as so(3) of $R_{A_1 B_1}$, an inner point of $^B P^T$, a scale ratio between the local maps) of A and B $^s AB$, and depths of the features of two nodes $j_1$ and $j_2$.

Then, the error of each edge $e_{j_1 j_2} = e(x_{j_1 j_2})$ can be derived by substituting $^t B_{j_1} A_{j_1}$ and $^t A_{j_2} B_{j_2}$ of (3) to (2) and extracting the unknown variables $x_{j_1 j_2}$ explicitly $$e_{j_1 j_2} = R_{A_1 A_{j_1}} \left[ ^{A_{j_2}} Z R_{A_{j_1} A_{j_2}} {}^{A_{j_2}} \overline{p} - {}^{A_{j_1}} Z^{A_{j_1}} \overline{p} + t_{A_{j_1} A_{j_2}} \right] +$$
$$R_{A_1 B_1} \left[ \left( R_{B_1 B_{j_1}} - R_{B_1 B_{j_2}} \right)^B P - s_{AB} R_{B_1 B_{j_1}} t_{B_{j_1} B_{j_2}} \right], \tag{4}$$

where all the terms of (4) are represented in $\{A_1\}$.

Since the APs are estimated by monocular SLAM, the scale ratio $s_{AB}$ should be compensated when the poses estimated by one platform are represented in the local map of the other platform.

The error of each edge can be used to formulate a nonconvex optimization problem as in (5) with positive depths and scale ratio constraints $$x^* = \underset{x}{\operatorname{argmin}} \sum_{(i,k) \in E} \rho_h \left( e_{ik}^T W_{ik} e_{ik} \right) \tag{5}$$

subject to $s_{AB} > 0$, $\{^{A_j} Z\}_{j \in J} > 0$ where $$x = \bigcup_{(i,k) \in E} x_{ik}$$
$$= \left\{ \omega_{A_1 B_1}^T, {}^B P^T, s_{AB}, \{^{A_j} Z\}_{j \in J} \right\}^T \in \mathbb{R}^{n+7}$$

Here, $\rho_h$ is the robust Huber cost function, and $W_{ik}$ is the weight matrix of the edge (i, k). The edge constraints consist of the SLAM-estimated relative poses between the two nodes of the edge. Since the estimated values have an error, the weight matrix is associated with the inverse gap between the two nodes. To ensure the uniqueness of the optimal solution, the number of independent constraints $3(n-1)$ should not be less than the number of unknown variables $(n+7)$ for n nodes. Therefore, theoretically, NSFs should be tracked no less than five times to obtain a unique solution.

B. Edge Selection

A graph with n nodes can have up to $$\binom{n}{2}$$

edges. Using all possible edges may lead to a robust solution in that it can take into account all the relationships between observations; however, it has a disadvantage of significant computation time. Therefore, edges that satisfy certain conditions are used, not all the available edges. Since each edge is constructed from the SLAM-estimated poses by the observer and observable platforms, the bigger the gap between the two nodes of an edge, the larger the SLAM drift is. Edges that have very large gaps are not reliable, and they can contaminate the optimization. In order to avoid this, edges with small gaps are given a high priority.

Figure 7:
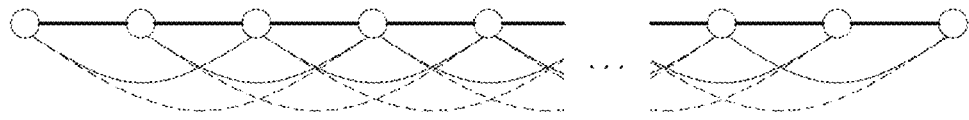
FIG. 7 shows edges in a graph with n nodes.

FIG. 7 shows edges with 1, 2, and 3 gaps between the edge nodes in bold line, thin line, and dotted line, respectively. The edges of a graph with n nodes are shown in FIG.

4. Circles represent nodes. The bold, thin, and dotted lines represent edges with 1, 2, and 3 gaps between the edge nodes, respectively.

The set of edges with gaps not exceeding the edge connection parameter $N_{gap}$ are defined as $E_{N_{gap}}$ $$E_1 = \begin{bmatrix} (j_1, j_2) \\ \vdots \\ (j_{n-1}, j_n) \end{bmatrix}, \dots, E_{N_{gap}} = \begin{bmatrix} E_{N_{gap}-1} \\ (j_1, j_{1+N_{gap}}) \\ \vdots \\ (j_{n-N_{gap}}, j_n) \end{bmatrix}. \tag{6}$$

The proposed AM is evaluated in terms of computation time and accuracy of solutions by changing edge connection parameter $N_{gap}$.

To prevent the selected edges from increasing continually as the number of nodes increases, $N_{max}$ nodes are sampled uniformly if the total number of nodes is larger than the parameter $N_{max}$.

C. Alternating Minimization Algorithm

An alternating minimization (AM) algorithm is proposed to solve the nonconvex optimization problem in (5). The optimization variable $x \in \mathbb{R}^{n+7}$ is partitioned into two parts, $x_1$ and $x_2$:

$$x_1 = R_{A_1 B_1} \in SO(3) \tag{7}$$
$$x_2 = \left\{ {}^B P^T, s_{AB}, \{^{A_j} Z\}_{j \in J} \right\}^T \in \mathbb{R}^{n+4}.$$

First, fixing the subset $x_1$ for an edge (i, k), (4) can be reformulated to the following equation:

$$e_{2,ik} = A_{ik} x_2 - b_{ik} \in \mathbb{R}^{3 \times 1} \tag{8}$$
$$A_{ik} = [a_{1,ik} \ a_{2,ik} \ a_{3,ik}] \in \mathbb{R}^{3 \times (n+4)}$$
$$b_{ik} = -R_{A_1 A_i} t_{A_i A_k} \in \mathbb{R}^{3 \times 1}$$

where $$a_{1,ik} = \left[ R_{A_1 B_i} - R_{A_1 B_k} \right], a_{2,ik} = \left[ -R_{A_1 A_i} t_{B_i B_k} \right]$$
$$a_{3,ik} = \left[ 0 \ \dots \ -R_{A_1 A_i} {}^{A_i} \overline{p} \ \dots \ R_{A_1 A_k} {}^{A_k} \overline{p} \ \dots \ 0 \right].$$

Two nonzero elements of $a_{3,ik}$ are in the ith and kth columns.

The first sub-optimization problem using the reformulated error (8) can be expressed as the following equation, which has a closed-form solution:

$$x_2^* = \underset{x_2}{\operatorname{argmin}} \sum_{(i,k) \in E} e_{2,ik}^T W_{ik} e_{2,ik} \tag{9}$$
$$= \underset{x_2}{\operatorname{argmin}} (Ax_2 - b)^T W (Ax_2 - b)$$
$$= \left( A^T W A \right)^{-1} A^T W b$$

where $$A = \begin{bmatrix} A_{i_1 k_1} \\ \vdots \\ A_{i_{end} k_{end}} \end{bmatrix}, b = \begin{bmatrix} b_{i_1 k_1} \\ \vdots \\ b_{i_{end} k_{end}} \end{bmatrix}$$

-continued $$W = \begin{bmatrix} W_{i_1 k_1} & & \\ & \ddots & \\ & & W_{i_{end} k_{end}} \end{bmatrix}.$$

If the closed-form solution has negative depths or a negative scale ratio, quadratic programming (QP Solver) with proper constraints may be used to solve the suboptimization.

Once $$x_2^*$$

is computed by (9), $x_2$ of (4) is set to $$x_2^*$$

in order to form the other suboptimization problem. Then, (4) can be reformulated to new edge error which involves $x_1$ only $$e_{1,ik} = x_1 c_{ik} - d_{ik} \tag{10}$$

$$c_{ik} = \left(R_{B_1 B_i} - R_{B_1 B_k}\right)^B P - s_{AB} R_{B_1 B_i} t_{B_i B_k} \in \mathbb{R}^{3 \times 1}$$

$$d_{ik} = R_{A_1 A_i}{}^{A_i} P - R_{A_1 A_k}{}^{A_k} P - R_{A_1 A_i} t_{A_i A_k} \in \mathbb{R}^{3 \times 1}.$$

The edge error (10) is used to construct the second subproblem (11), and this problem also has a closed-form solution $$\begin{aligned} x_1^* &= \underset{x_1 \in SO(3)}{\text{argmin}} \sum_{(i,k) \in E} e_{1,ik}^T W_{ik} e_{1,ik} \tag{11} \\ &= \underset{x_1 \in SO(3)}{\text{argmin}} \sum_{(i,k) \in E} -2 w_{ik} d_{ik}^T x_1 c_{ik} \\ &= \underset{x_1 \in SO(3)}{\text{argmintrace}}\left(x_1 CWD^T\right) \\ &= \underset{x_1 \in SO(3)}{\text{argmintrace}}\left(\sum M\right) \\ &= \underset{x_1 \in SO(3)}{\text{argmintrace}}\left(\sum\right) \end{aligned}$$

$$W = \text{diag}\left(w_{i_1 k_1}, \dots, w_{i_{end} k_{end}}\right)$$
$$C = \left[c_{i_1 k_1} \ \dots \ , c_{i_{end} k_{end}}\right]$$
$$D = \left[d_{i_1 k_1} \ \dots \ , d_{i_{end} k_{end}}\right]$$
$$[U, \Sigma, V] = SVD\left(CWD^T\right)$$
$$M = V^T x_1 U \text{ is an orthogonal matrix}$$

Here, SVD denotes singular value decomposition. Since M is an orthogonal matrix and $\Sigma$ is a diagonal matrix with nonnegative elements, M should be the identity matrix in order to maximize trace ($\Sigma M$) in (11). Therefore, the optimal $x_1$ can be computed as follows:

$$x_1^* = VGU^T, \text{ where } G = \begin{bmatrix} 1 & 0 & 0 \\ 0 & 1 & 0 \\ 0 & 0 & \det(UV) \end{bmatrix}. \tag{12}$$

G is used to satisfy that $\det(x_1) = +1$, which is one of the SO(3) constraints.

The proposed AM algorithm repeats the two subprocesses, i.e., (9) and (12), until the termination criteria are satisfied, as shown in Algorithm 2. In Algorithm 2, the Huber function can alleviate the effects of outlier nodes, which have been tracked into the wrong points or matched incorrectly during the NSF tracking process. AM algorithm converges quickly without step-size parameter tuning because both suboptimization problems have closed-form solutions. Furthermore, the convergence of the proposed AM algorithm is always guaranteed because two subprocesses (9) and (12) reduce the cost function of the original optimization problem (5) repeatedly.

| Algorithm 2 Alternating Minimization Algorithm |
|---|
| 1:      Input: $IN_{AM} = \{^A\bar{p} \ T_{A_j A_i}, T_{B_j B_i}\} j \in J$ |
| 2:      $x_1^{init}$, b ← initialize $(IN_{AM})$ |
| 3:      E, $W_1$, $W_2$ ← selectEdge $(IN_{AM})$ |
| 4:      k = 0 |
| 5:      $e^{<0>}$ ← large value |
| 6:      while $(|(e^{<k+1>} - e^{<k>})/e^{<k+1>}| < \epsilon)$ do |
| 7:          % $x_1$ Fixed, compute the optimal $x_2$ |
| 8:          A ← constructA $(x_1^{<k>}, E, IN_{AM})$ |
| 9:          $x_2^{<k+1>}$ ← $(A_T W_2 A)^{-1} A^T W_2 b$ |
| 10:         if $(^{Aj}Z, s_{AB} < 0)$ then |
| 11:           $x_2^{<k+1>}$ ← solveQP(A, $W_2$, b) |
| 12:         end if |
| 13: |
| 14:         % $x_2$ Fixed, compute the optimal $x_1$ |
| 15:         C, D ← constructCD$(x_2^{<k+1>}, E, IN_{AM})$ |
| 16:         [U, $\Sigma$, V] ← SVD($CW_1 D^T$) |
| 17:         $x_1^{<k+1>}$ ← $V \begin{bmatrix} 1 & 0 & 0 \\ 0 & 1 & 0 \\ 0 & 0 & \det(UV) \end{bmatrix} U^T$ |
| 18: |
| 19: |
| 20:         % Compute error and update Huber weight |
| 21:         $[e^{<k>}, W_1, W_2]$ ← Huber$(x_1^{<k+1>}, C, D, W_1, W_2)$ |
| 22:         k + + |
| 23:      end while |
| 24:      err ← $\|e^{<k>}\|$ |
| 25:      x ← $(x_1^{<k>}, x_2^{<k>})$ |

D. Initial Value

General optimization algorithms such as Levenberg-Marquardt (LM) or gradient descent need the initial value of full optimization variables $$x = \left\{\omega_{A_1 B_i}^T, {}^B P^T, s_{AB}, \left\{^{A_j} Z\right\}_{j \in J}\right\}^T \in \mathbb{R}^{n+7}.$$

However, AM algorithm requires initial values for either of the two subsets $$x_1 = R_{A_1 B_i} \in SO(3),$$

$$x_1 = \left\{^B P^T, s_{AB}, \left\{^{A_j} Z\right\}_{j \in J}\right\}^T \in \mathbb{R}^{n+4}.$$

The initial value of $x_1$ is computed using the depth property, which means that the depth of each tracked feature remains constant. The tracked NSFs that are received from each agent are produced by the two algorithms of the single-platform module: a KLT tracker that does not compensate for the scale, and a descriptor matching algorithm that is triggered when the batch size condition is satisfied. If the depths of the tracked NSFs are different, their tracking or matching might fail, because the descriptors and the patches for tracking depend on the depths of features. Therefore, only the NSFs whose depths change rarely during the tracking process can be successfully tracked, and (4) can be expressed as (13) using the depth property of features $$e_{ik}^{init} = s_{AB}x_1 c'_{ik} - d'_{ik} \qquad (13)$$

$$c'_{ik} = (R_{B_1 B_i} - R_{B_1 B_k})(^B P/s_{AB}) - R_{B_1 B_i} t_{B_i B_k}$$

$$d'_{ik} = Z(R_{A_1 A_i}{}^{A_i}\overline{p} - R_{A_1 A_k}{}^{A_k}\overline{p}) - R_{A_1 A_i} t_{A_i A_k}$$

$$Z = {}^{A_i} Z = {}^{A_k} Z.$$

To ignore the first term of $c_{ik}{}'$ in (13), the edges for the computation of initial value $E_{init}$ are re-selected. If the variation of the translation is more significant than the rotation between two nodes, $E_{init}$ is selected as the two nodes. The ratio between the changes of the translation and rotation is reflected in the weight matrix. The representative depth of the tracked features is the median depth of the static features in the frame from which the tracked features were first extracted. Lastly, we can remove the scale ratio $s_{AB}$ of (13) using the normalized $\overline{c}_{ik}{}'$ and $\overline{d}_{ik}{}'$, and (13) can be expressed as $$e_{ik}^{init} = x_1 \overline{c}'_{ik} - \overline{d}'_{ik} \qquad (14)$$

$$c'_{ik} = -R_{B_1 B_i} t_{B_i B_k} / \|R_{B_1 B_i} t_{B_i B_k}\|$$

$$d'_{ik} = d'_{ik} / \|d'_{ik}\|.$$

Equation (14) can be used to derive an optimization problem for the initial value, which can be solved in the same way as (11) and (12)

$$x_1^{init} = \underset{x_1 \in SO(3)}{\operatorname{argmin}} \sum_{(i,k) \in E_{init}} w'_{ik} \|x_1 \overline{c}'_{ik} - \overline{d}'_{ik}\|_2^2 \qquad (15)$$

$$= V' \begin{bmatrix} 1 & 0 & 0 \\ 0 & 1 & 0 \\ 0 & 0 & \det(U'V') \end{bmatrix} U'^T$$

$$W' = \operatorname{diag}(w'_{i_1 k_1}, \cdots, w'_{i_{end} k_{end}})$$

$$C' = [\overline{c}'_{i_1 k_1} \cdots, \overline{c}'_{i_{end} k_{end}}]$$

$$D' = [\overline{d}'_{i_1 k_1} \cdots, \overline{d}'_{i_{end} k_{end}}]$$

$$[U', \textstyle\sum', V'^T] = SVD(C'W'D'^T)$$

Here, $w_{ik}{}'$ is associated with the ratio between the changes of $t_{B_i}{}^{B_k}$ and $R_{B_i}{}^{B_k}$. In one embodiment, the maximum number of initial edges is limited to 50. If the number of features is larger than the MF parameter $N_{mf}$, the mean of the AM results of the features is used as the initial value.

E. Identification

The criteria of the FI, which check if NSFs of a platform A point to an observable platform B will be described. NSFs are sent to the ground station each time the number of tracking becomes a multiple of $N_{bs}$. If new NSFs enter the NSFs stack or the existing NSFs are updated, the FI module is triggered. The results and the error of AM algorithm $\{^k x, {}^k err\}_{k=1:N_{AM}}$ are stored for identification, where the left superscripts indicate the kth result and error of AM, respectively. $N_{AM}$ is the number of times when AM has been executed, and in this case, the features have been tracked as many times as $N_{AM} \times N_{bs}$.

| Algorithm 3 Identification |
| --- |

| | |
| --- | --- |
| 1: | Input: $\{^{A_j}\overline{p}\}j \in J$, $\{^k x, {}^k err\}k=1,...,N_{AM}$ |
| 2: | If $N_{AM} \geq 2$ then |
| 3: | if $^{N_{AM}}err < \epsilon_1$ then |
| 4: | if $\|^{N_{AM}}R_{A_1 B_1}{}^{N_{AM}-1}R_{A_1 B_1}{}^T - I\| < \epsilon_2$ then |
| 5: | % Identification is successful |
| 6: | $\{\overline{p}_{i_B}{}^B\} \leftarrow \{^{A_j}\overline{p}\}j \in J$ |
| 7: | $\{x_{i_B}{}^B, err_{i_B}{}^B\} \leftarrow \{^{N_{AM}}x, {}^{N_{AM}}err\}$ |
| 8: | $i_B \leftarrow i_B + 1$ |
| 9: | end if |
| 10: | end if |
| 11: | end if |

To be a feature (team-feature), the following conditions should be satisfied:

1) the final error $N_{AM_{err}}$ should be sufficiently small, and 2) the AM solutions of the same feature should converge to a similar value regardless of the number of tracks.

The features that satisfy these two conditions are treated as features $$\{\overline{p}_{i_B}{}^B\},$$

and $i_B$ is the number of identified features of platform B. If the features are selected, the results and error $$\{x_{i_B}{}^B, err_{i_B}{}^B\}$$

of the AM algorithm are also stored for MF. The procedure of the identification is shown in Algorithm 3.

So far, the FI module has been described for a situation where only two platforms operate.

Hence, the identification of NSFs needed to be carried out only for one available platform. In cases with more than two observable platforms, however, there may exist a singular case that causes uncertainty during the identification process. For example, the identification becomes obscure if observable platforms have similar motion over the duration when a specific NSF is tracked by the observer platform. Since the NSF can be matched to multiple platforms with similar motions in such case, the identification of the specific NSF is held off until only one matched platform remains. Some platforms that succeeded in MF can determine in advance the inter-platform visibility, i.e., whether the platforms that succeeded in MF have entered one another's image or not. Using this knowledge, the uncertainty of the platform identification can be alleviated by eliminating invisible platforms.

Map fusion module integrates local maps of the observer and observed platforms into a global map using features when the number of features is larger than $N_{mf}$. The SIM(3) between two local maps, which is equal to a scale ratio between two local maps and the SE(3) of the relative initial pose, should be computed to fuse local maps. Only the relative initial translation is necessary to compute the SIM (3) because the other parameters are included explicitly in the AM solution, which offers an inner point of the observed platforms, a scale ratio, depths, and the relative rotation between the initial pose of the platforms A and B. The relative initial translation can be computed as follows:

$$t_{A_1 B_1} = \sum_{j \in J} w_j \left[ t_{A_1 A_j} + s_{AB} R_{A_1 B_j} t_{B_j B_1} + R_{A_1 B_j} t_{A_j B_j} \right] \qquad (16)$$

$$= \sum_{j \in J} w_j \left[ t_{A_1 A_j} + R_{A_1 A_j} \left( {}^{A_j} Z^{A_j} \overline{p} \right) + \right.$$

$$\left. R_{A_1 B_1} R_{B_1 B_j} \left( s_{AB} t_{B_j B_1} - {}^{B} P \right) \right]$$

Since AM solutions of all features have information about $t_{A_1 B_1}$, $t_{A_1 B_1}$ can be computed by weighted average. The weight is set to be inversely proportional to the error of each node, which is derived from the AM solution. SIM(3) can be computed by each feature using (16), and we exploit 1-point RANSAC to reject outliers of features such as identified NSFs extracted from dynamic obstacles with similar movements. The inliers of features are used to compute SIM(3). Then, the MF module accesses the stack for local maps to make a global map where both MPs and APs of the observer and observed platforms are represented with respect to the initial pose of the observer platform {$A_1$}.

The following describes the results from four Experiments using the proposed collaborative monocular SLAM. The experimental setup is described, and the main modules such as FI and MF modules are analyzed. The system according to one embodiment is then evaluated in terms of robustness and scalability.

A. EXPERIMENTAL SETUP

Figure 8:
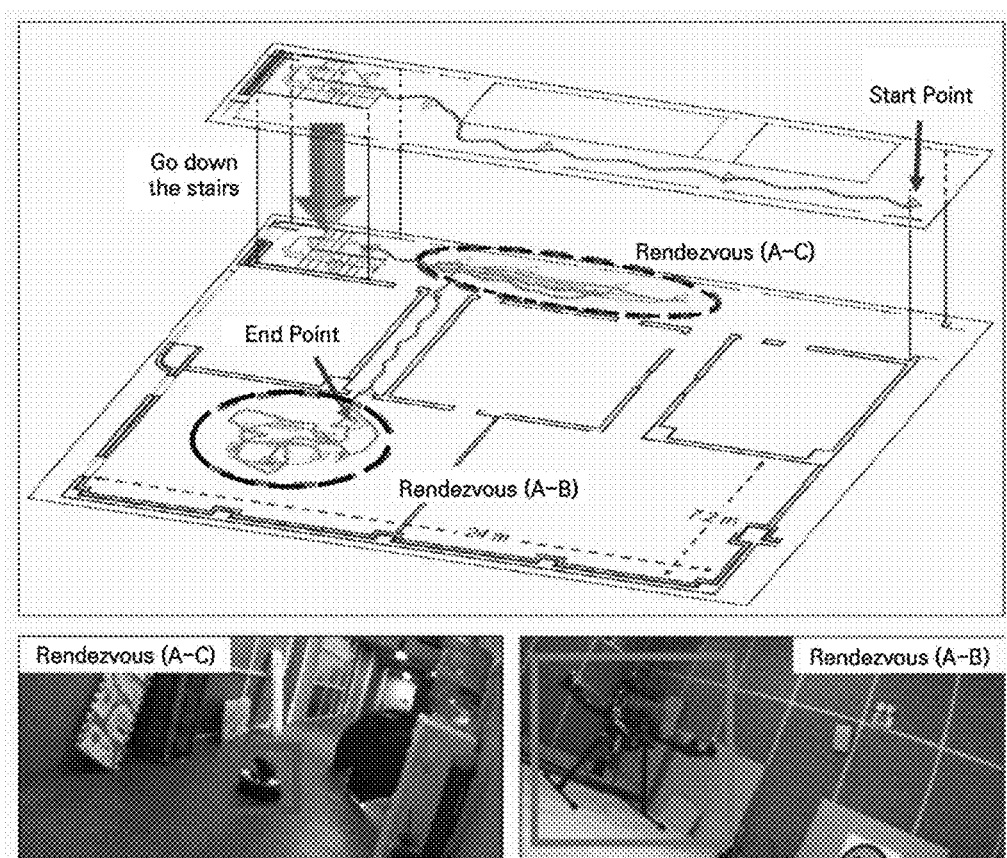
FIG. 8 shows environment for Experiment 4.

Table 1 describes the experimental setups. Experiment 1 is not for evaluating collaborative monocular SLAM but for analyzing the performance of the FI and MF modules. The overall framework and each module are evaluated in the Experiments 2-4. Multiple platforms in Experiments 1-3 move around in an indoor space where the rendezvous between platforms A and B occur in Experiment 4, as shown in FIG. 8. In order to evaluate the performance of each module, the ground truth of platforms' poses will be obtained from a motion capture system. However, because Experiment 4 involves areas outside the confines of the motion capture system, the true transformation between local maps was manually computed using fiducial objects. Since the MF exploiting rendezvous where it is difficult to rely on interloop detection, Experiments 2-4 are designed as follows: the cameras mounted on platforms have different viewpoints, and the environment has many similar scenes. The detailed configuration of each Experiment is described in each subsection as follows.

1) Experiment 1

The handheld camera and flat board with rich features are defined as platforms A and B, respectively. The pose of B is provided by the motion capture system, and the monocular camera of platform A is used to implement SLAM and extract NSFs. The FI and MF modules are evaluated in a rendezvous situation where the platform A constantly looks at one side of platform B.

2) Experiment 2

A unmanned aerial vehicle (UAV) and a unmanned ground vehicle (UGV), each equipped with a monocular camera of a top-down view and a front view, respectively, are defined as platforms A and B, respectively. The platform A moves along the trajectory with the shape of FIG. 13 observing the floor, and the platform B moves along an elliptical orbit, looking at the wall. Since platforms A and B have completely different views, it is difficult for two platforms to observe the same scene. Hence, CCM-SLAM, which is a collaborative monocular SLAM with MF using interloop detection, cannot detect interloop between A and B. The total duration of Experiment 2 is 42.5 s, and the time duration of the actual rendezvous during which A observes B is defined as $$\tau_{A-B}^{rdzv},$$

as shown in FIG. 13.

3) Experiment 3

One handheld camera and two Pioneer 3-DX platforms equipped with monocular cameras are used in Experiment 3. The handheld camera is defined as platform A and the Pioneer looking upward is defined as platform B, and the Pioneer looking downward is defined as platform C. CCM-SLAM yields the wrong interloop detection between the platforms A and C due to similar scenes in the different places, and MF does not happen as a result. The experimental duration is 75 s, and the actual rendezvous is maintained during the time intervals of $$\tau_{A-B}^{rdzv}$$

and $$\tau_{A-C}^{rdzv}$$

when the platform A observes the platforms B and C, respectively. The actual rendezvous durations $$\tau_{A-B}^{rdzv}$$

and $$\tau_{A-C}^{rdzv}$$

of Experiment 3 are depicted in FIG. 13.

4) Experiment 4

Three platforms are used in Experiment 4: a handheld camera, a hexarotor, and a Turtlebot3 with monocular cameras are defined as platforms A, B, and C, respectively. FIG. 8 shows the trajectories of both platforms used in Experiment 4. The platform A starts from an end of the second-floor corridor, takes down the stairs, moves along the first-floor corridor, and then enters the room where the platform B flies. The rendezvous between the platforms A and C takes place in the first-floor corridor, and the rendezvous between platforms A and B occurs in the room on the first floor. CCM-SLAM finds the correct interloop between platforms A and C using visual boards on the first corridor, but MF associated with the local map of platform B does not happen. The actual rendezvous durations during which platform A observes platforms B and C are denoted as $$\tau_{A-B}^{rdzv}$$

and $$\tau_{A-C}^{rdzv}$$

as shown in FIG. 14.

FIG. 8 is a diagram of the environment for Experiment 4. The trajectories represent platforms A, B, and C. The two lower images were captured by platform A during rendezvous A-B, A-C.

B. FEATURE IDENTIFICATION MODULE

The feature identification (FI) module extracts the features among NSFs, which are anonymous bearing measurements with false positive using the proposed AM algorithm.

The FI module is analyzed by changing the hyperparameters of batch size parameter $N_{bs}$ and edge connection parameter $N_{gap}$, respectively. Furthermore, the AM algorithm compared with the popular LM method, which is often used to solve nonlinear optimization problems. The parameters for the maximum number of nodes $N_{max}$ and for the MF condition $N_{mf}$, which do not significantly affect the proposed collaborative monocular SLAM system according to one embodiment, are experimentally set to 50 and 10, respectively.

1) Batch Size Parameter: Whenever NSFs are tracked multiples of $N_{bs}$ times, the NSFs are sent to the ground station, and the FI module is called. Hence, the batch size parameter $N_{bs}$ significantly affects the amount of computation by the FI module per frame and the first MF instant.

Figure 9:
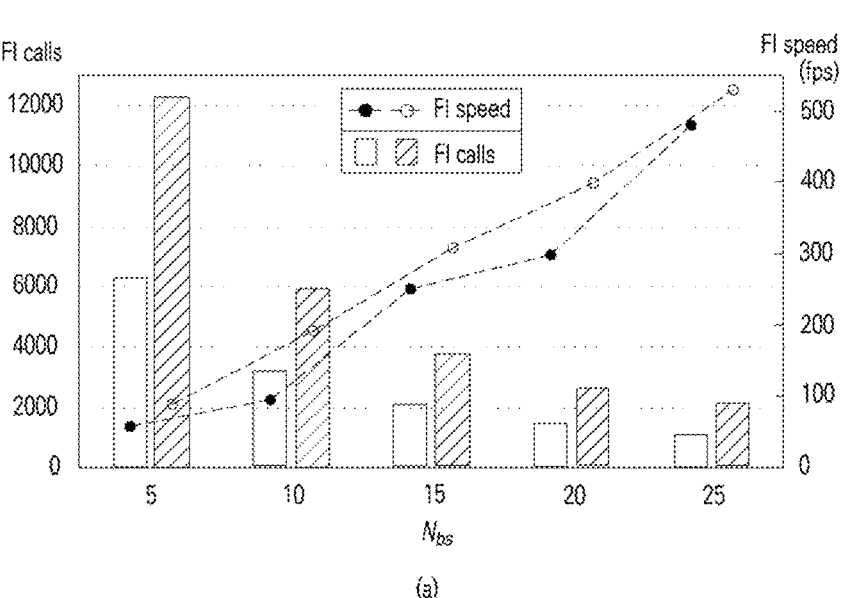
FIG. 9 shows computation load of the FI module and the first MF instant in Experiments 1 and 2.
Figure 9:
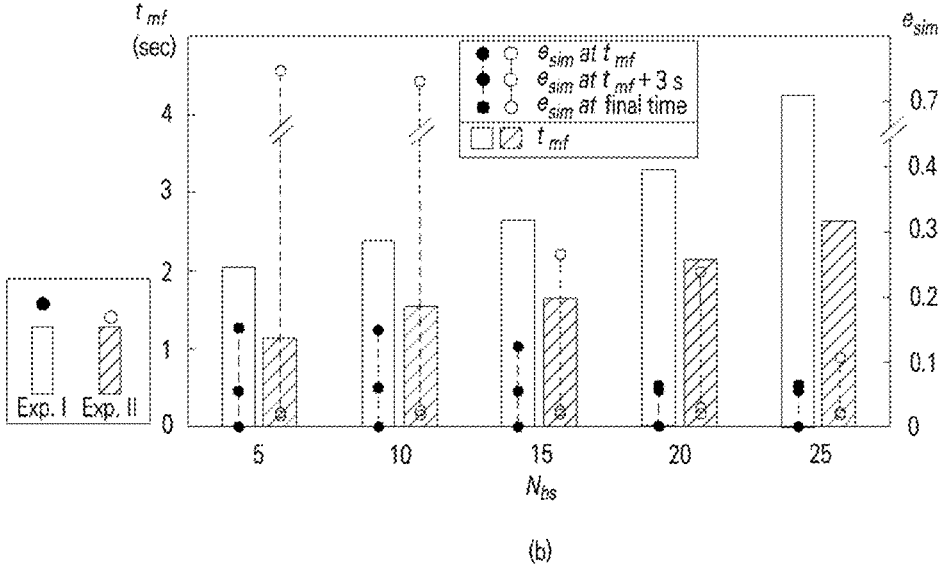

FIG. 9 provides the results from Experiments 1 and 2 as $N_{bs}$ changes. The first graph (a) of FIG. 9 shows that as $N_{bs}$ increases, the calls to the FI module decrease, and the FI speed, which is the computation time per frame in the FI module increases accordingly. The second graph (b) of FIG. 9 shows the first MF instant $t_{mf}$ and the similarity error $e_{sim}$ computed at three time instants. The similarity error is computed as $$e_{sim} = \mathrm{rms}\left(\log_{sim(3)}\left(S_{GT}S_{Est}^{-1}\right)\right), \tag{17}$$

where rms(•) denotes the root mean square, and $\log_{sim(3)}$ is the logarithmic transformation from SIM(3)$\in \mathbb{R}^{4\times4}$ to sim(3)$\in \mathbb{R}^7$. $S_{GT}$ and $S_{Est}$ are the ground truth and estimation of the SIM between two local maps. The translation parts of $S_{Est}$ are converted to include the global scale before computing the similarity error. The local maps are integrated into a global map when the number of features is larger than $N_{mf}$, and the first MF instant $t_{mf}$ is defined as the first moment at which the MF takes place after the actual rendezvous begins.

The first MF instant $t_{mf}$ is delayed by less frequent observation updates (i.e., large $N_{bs}$), as shown in FIG. 9. The updates of observations occur more frequently with small $N_{bs}$, initiating the MF earlier. Ideally, since at least two results from the FI module are needed to identify an NSF as a feature, the earliest theoretical $t_{mf}$ is $$\frac{2\times N_{bs}}{\text{frame rate}}$$

seconds. Hence, in setting of 20 frame rate, at least $0.1\times N_{bs}$ seconds is needed to integrate local maps into a global map. The actual $t_{mf}$ of experimental results is slightly longer than the theoretical time, because observations can become insufficient for identification if the NSF tracking fails. Especially for small $N_{bs}$, it is difficult to collect enough observations until the theoretical time.

Figure 10:
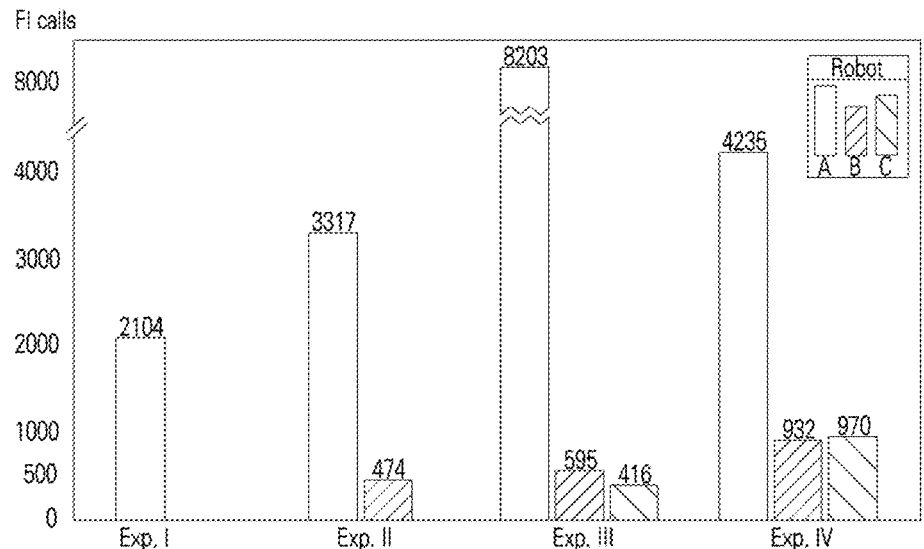
FIG. 10 shows calls of the FI module in all experiments ($N_{bs}$=15). The red, blue, and green bars represent the FI calls from the platforms A, B, and C images, respectively.

Regarding the similarity error, $e_{sim}$ at $t_{mf}$ is small for large $N_{bs}$ because more observations of the tracked NSFs are collected during the delay. However, the similarity error values with different $N_{bs}$ settings become almost the same within three seconds after $t_{mf}$. Therefore, Nbs is set to 15 by considering the computation load of the FI module and the first MF instant. The FI calls of all experiments are shown in FIG. 10. Since the platform A serves as the observer in rendezvous situations of all experiments, the calls to the FI module from the platform A are much larger than those of the other platforms.

2) Alternating Minimization Algorithm:

The AM algorithm according to one embodiment is analyzed in terms of the computation time and the accuracy of solutions by changing $N_{gap}$, i.e., the gap between the edge nodes. The AM algorithms using $E_1$ and $E_{N_{gap}}$ are called AM and AM(Ngap), respectively. The LM algorithm is used as a baseline for comparison. It requires the initial value of full variables x, whereas the AM method needs the initial value for either of the two subsets or $x_1$ or $x_2$ only. The initial value of $x_1$ is computed using the depth property of the tracked NSFs, so the other subset $x_2$ should be obtained to implement the LM algorithm. The baseline algorithm using two different methods of obtaining the initial value of $x_2$ are designed. The first method is to exploit the raw conditions such as the zero position of inner points (i.e., $^BP=[0,0,0]^T$.), normalization with the scale ratio (i.e., $s_{AB}=1$), and the depth property, which are used to compute the initial value of $x_1$. The second is to use the solution $x_2$ of the 1-step AM. The first and second methods are denoted as LM and AMLM, respectively. The baseline algorithms are implemented using $E_1$. All algorithms are run with the same termination criteria, in MATLAB on a laptop described in Table 1.

TABLE 1

|  |  | Platform | Computer | Sensor | Sensor type | Camera view | Duration |
|---|---|---|---|---|---|---|---|
| Exp. I | Robot A | Handheld | Laptop | Monocular | Bluefox2/752 × 480/20 fps | Free | 25 sec |
|  | Robot B | Flat board | — | — | — | — |  |
| Exp. II | Ground Station | — | Laptop | — | — | — | 42.5 sec |
|  | Robot A | Hexarotor | NUC | Monocular | Bluefox2/752 × 480/20 fps | Top-down |  |

TABLE 1-continued

| | | Platform | Computer | Sensor | Sensor type | Camera view | Duration |
|---|---|---|---|---|---|---|---|
| | Robot B | Pioneer 3-DX | NUC | Monocular | Bluefox2/752 × 480/20 fps | Front | |
| Exp. III | Ground station | — | Laptop | — | — | — | 75 sec |
| | Robot A | Handheld | NUC | Monocular | Bluefox2/752 × 480/20 fps | Free | |
| | Robot B | Pioneer 3-DX | NUC | Monocular | Bluefox2/752 × 480/20 fps | Tilted up (+20°) | |
| | Robot C | Pioneer 3-DX | NUC | Monocular | Bluefox2/752 × 480/20 fps | Tilted down (−20°) | |
| Exp. IV | Ground station | — | Laptop | — | — | — | 163.7 sec |
| | Robot A | Handheld | NUC | Monocular | Bluefox2/752 × 480/20 fps | Free | |
| | Robot B | Hexarotor | NUC | Monocular | Bluefox2/752 × 480/20 fps | Top-down | |
| | Robot C | Turtlebot3 | NUC | Monocular | Bluefox2/752 × 480/20 fps | Front | |

Table 2 shows the convergence time and the similarity error $e_{sim}$ of the AM series and baseline algorithms in each Experiment.

TABLE 2

| | | AM | AM(3) | AM(5) | LM | AMLM |
|---|---|---|---|---|---|---|
| Exp. I | Conv. time [msec] | .91 ± 1.35 (.63) | 2.36 ± 2.18 (1.83) | 3.58 ± 2.52 (2.99) | 12.92 ± 10.57 (12.39) | 3.15 ± 3.32 (2.77) |
| | $e_{sim}$ (A-B) | 2.69 ± 8.60 (1.32) | 2.61 ± 8.78 (1.13) | 2.33 ± 9.60 (1.08) | 38.61 ± 43.97 (33.48) | 8.07 ± 32.59 (3.21) |
| Exp. II | Conv. time [msec] | .62 ± .29 (.59) | 1.77 ± .63 (1.74) | 3.17 ± 1.36 (3.26) | 5.10 ± 5.48 (4.53) | 1.41 ± 1.86 (1.01) |
| | $e_{sim}$ (A-B) | 14.71 ± 46.88 (5.47) | 10.41 ± 40.54 (4.65) | 9.71 ± 41.39 (4.35) | 50.19 ± 99.98 (35.57) | 16.88 ± 61.63 (6.86) |
| Exp. III | Conv. time [msec] | .93 ± 1.30 (.64) | 2.11 ± 1.58 (1.81) | 3.34 ± 1.93 (2.97) | 14.86 ± 11.65 (14.78) | 2.10 ± 4.32 (1.62) |
| | $e_{sim}$ (A-B) | 7.42 ± 39.78 (2.66) | 6.31 ± 36.17 (2.28) | 4.36 ± 23.32 (2.08) | 20.09 ± 41.49 (20.14) | 11.88 ± 49.96 (3.95) |
| | $e_{sim}$ (A-C) | 6.77 ± 29.62 (3.72) | 5.75 ± 21.39 (3.11) | 4.95 ± 19.50 (2.93) | — | 10.21 ± 32.86 (5.37) |
| Exp. IV | Conv. time [msec] | 1.08 ± 1.59 (.68) | 2.38 ± 1.88 (1.94) | 3.62 ± 2.39 (3.08) | 18.40 ± 12.31 (17.70) | 3.15 ± 7.70 (1.84) |
| | $e_{sim}$ (A-B) | 9.59 ± 11.70 (7.85) | 9.57 ± 11.65 (7.56) | 9.11 ± 11.15 (6.87) | — | 13.94 ± 20.69 (10.14) |
| | $e_{sim}$ (A-C) | 3.96 ± 4.11 (3.77) | 3.83 ± 3.91 (3.67) | 3.33 ± 3.15 (3.15) | — | 5.22 ± 6.42 (4.81) |

The convergence time represents the average and standard deviation of the time taken to converge using each algorithm whenever the FI module is triggered, and $e_{sim}$ is the similarity error computed using sim(3) of features. The AM series has much better performance, such as fast convergence times and accurate solutions, than the baseline algorithms, i.e., LM and AMLM. Among AM, AM(3), and AM(5), the AM algorithm has the fastest convergence time at about 0.6 ms (median value). As $N_{gap}$ increases, the accuracy of solution increases, and the computation time also increases rapidly. Such relationship between the accuracy and the speed of each algorithm is clear in FIG. 11. It takes much longer for the optimization variables of the LM and AMLM to converge compared with the AM algorithm, even though the same edge connection parameter $N_{gap}$ is used. This is because the number of variables required to solve the LM optimization problem once is larger than the number of variables required to solve the AM subproblems. Also, the fact that the both subproblems of the AM according to one embodiment have closed-form solutions reduces the computation time significantly. Between two baseline algorithms, AMLM is faster and more accurate than LM. Moreover, the standard deviations of the speed and error of LM are larger than AMLM because the LM method's initial value is not accurate. In other words, the 1-step AM solutions provide the better initial value than using the raw condition. Unlike other algorithms, LM does not identify enough features of the platform C to fuse local maps in Experiment 3. Especially in Experiment 4, none of the features are identified.

Figure 11:
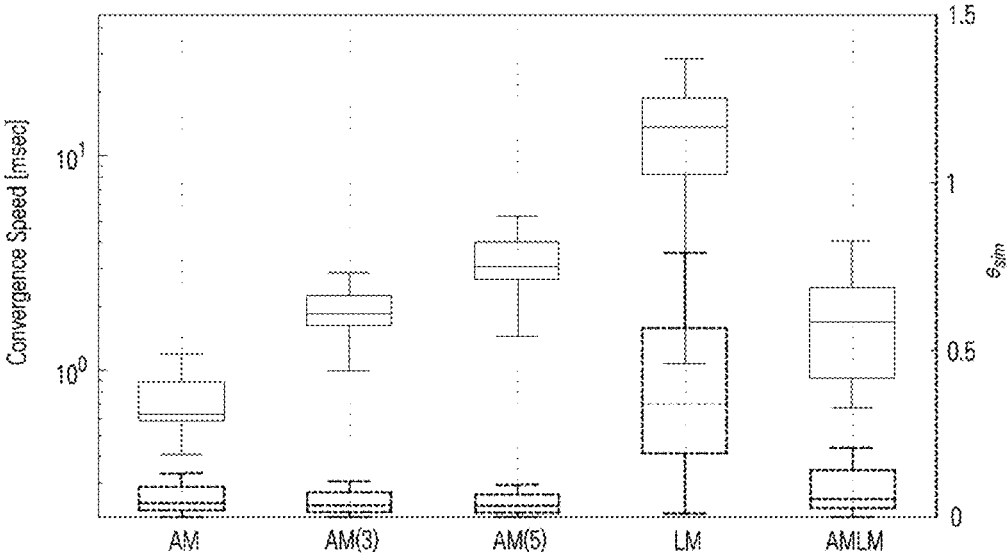
FIG. 11 shows convergence time and similarity error of the AM series and baseline algorithms according to one embodiment in all experiments.

FIG. 11 shows the convergence time and $e_{sim}$ of the proposed AM series and baseline algorithm for all experiments, in which the left y-axis (blue) with logarithmic scale represents the convergence time and the right y-axis (red) represents $e_{sim}$. Here, each box represents the 25th and 75th percentile and the whiskers represent the 95% confidence level, respectively.

C. MAP FUSION MODULE

The map fusion (MF) module integrates local maps of rendezvous associated platforms into a global map using features identified by the FI module. The first MF instant and the accuracy of the integrated global map are analyzed to evaluate the MF module.

Figure 12:
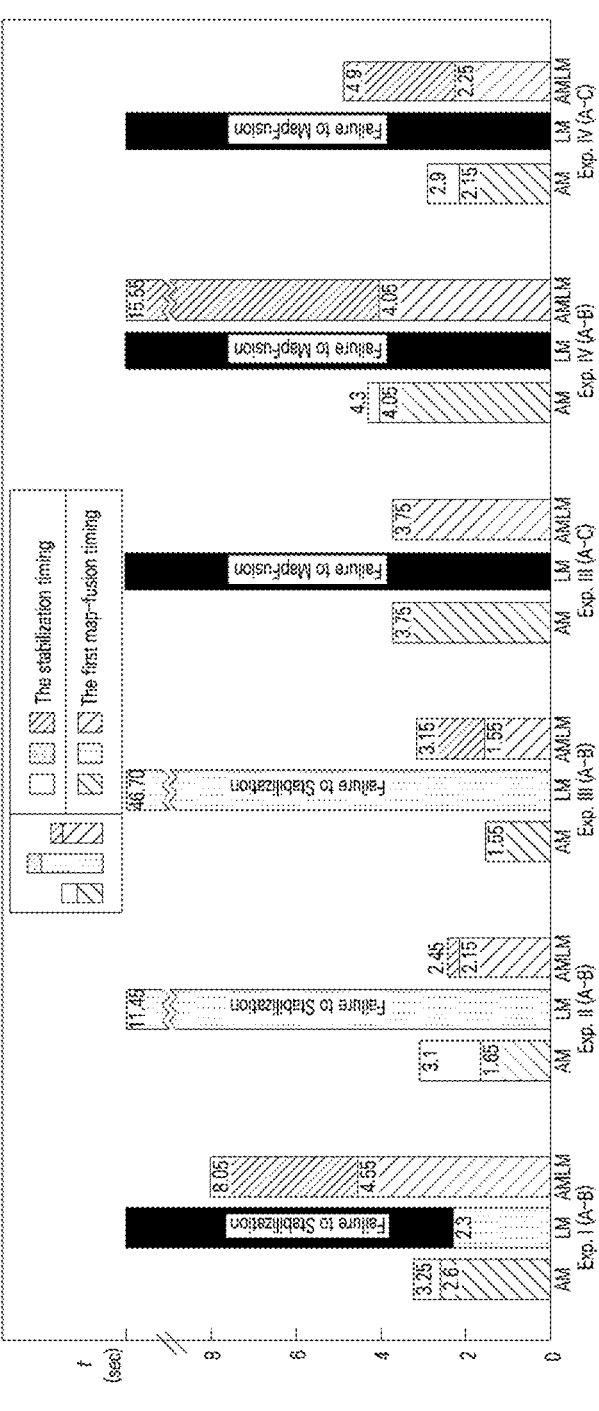
FIG. 12 shows the first MF instants using three algorithms in all experiments.

1) First MF Instant: FIG. 12 shows the first MF and the stabilization instants using AM, LM, and AMLM in all experiments. The stabilization instant is the time instant when the similarity error of the integrated map drops below the stabilization threshold (set to 0.1) after actual rendezvous. In Experiments 1-3 using LM, global maps including the local maps A and B are created successfully. However, none of the global maps are stabilized. The identified features are not sufficient for MF in Experiment 3 (A–C) and Experiment 4 (A–B) and (A–C). The AMLM method, which only changes the initial values to the 1-step AM solutions, shows much better results than LM. Still, in Experiments 1 and 4, it takes much longer for the MF results of AMLM to stabilize compared with AM, as shown in FIG. 9. Among the three algorithms, AM shows the fastest successful MF in all experiments, and with the exception of Experiment 2, the fastest stabilization of the combined map. In Experiment 3, the global maps created using AM are already highly accurate since the first MF instant.

The first MF and the stabilization instants vary in experiments because the tracking qualities of NSFs are different. Their tracking depends on how the observed platforms are captured in images of the observer platform, such as how large the projected size is and how much the viewpoints of which the observer platform views observed platforms change. In the first MF instants of Experiment 2 and Experiment 3 (A–B), which are almost the same as the theoretical MF instant, the viewpoints do not vary much and the observer platforms are captured in a large portion of the observer's image during the beginning of actual rendezvous. This promotes the collection of the critical observations of the NSFs during the early rendezvous interval, and leads to successful MF.

2) MF Results: FIG. 13 shows the results of the proposed multiplatform SLAM system using AM at specific time instants in Experiments 1-3.

In Experiment 1 shown in FIGS. 13 (1a) and (1b), as the number of features increases, the estimated SIM(3) becomes more accurate. At an early instant shown in FIG. 13 (1a), the estimated trajectory of the platform B is different from the ground truth (black dashed line), but in FIG. 13(1b), the blue line, which is merged into the global map using estimated SIM(3), is almost identical to the ground truth.

In FIG. 13 (2a) on Experiment 2, the rendezvous has not been recognized, and there are only local maps of A and B. In FIG. 13 (2b), which shows the first MF instant, there are a small number of features (blue) in image A. Although the integrated map is created, the map has some error because The FI module recognizes the rendezvous between A and C, and the global map (A+C) is created using the rendezvous. The zoom-in plots in the top right side of FIG. 11 confirm that the feature-rich boards observed by the platforms A and C accurately overlap in the global map. The platform A then enters the room where the platform B (drone) flies, and rendezvous between A and B occurs. In the A's images of FIGS. 14 (4b) and (4c) captured during the rendezvous $$\tau^{rdzv}_{A-B},$$

features of B (blue) are properly extracted inside the drone. The features of B, which are collected during $$\tau^{rdzv}_{A-B}$$

such as FIGS. 14 (4b) and (4c), are used to build the global map (A+B+C). As a result, FIG. 14 shows that all the local maps of A, B, and C are well-localized on the global map.

The summary of performances using the AM, LM, and AMLM algorithms can be seen in Table 3.

TABLE 3

| | Exp. I | | | Exp. II | | | Exp. III | | | Exp. IV | | |
|---|---|---|---|---|---|---|---|---|---|---|---|---|
| | AM | LM | AMLM | AM | LM | AMLM | AM | LM | AMLM | AM | LM | AMLM |
| Speed [fps] | 248.54 | 17.47 | 71.70 | 335.70 | 40.76 | 147.74 | 235.67 | 11.78 | 105.29 | 681.71 | 32.86 | 232.98 |
| # of team-features | 505 | 284 | 430 | 916 | 466 | 773 | 1083 ❘ 808 | 11 ❘ 0 | 1058 ❘ 769 | 433 ❘ 524 | 0 ❘ 0 | 417 ❘ 491 |
| $e_t$ [cm] | .78 | 12.51 | 1.52 | 4.11 | 10.51 | 5.49 | .37 ❘ .18 | 5.51 ❘ — | .59 ❘ 1.28 | 9.08 ❘ 1.52 | — ❘ — | 10.20 ❘ 2.71 |
| $e_r$ [°] | .18 | 4.90 | .43 | .24 | 2.36 | .23 | .06 ❘ .09 | 11.38 ❘ — | .12 ❘ 10 | .45 ❘ .33 | — ❘ — | .96 ❘ 1.33 |
| $e_s$ ($\times 10^{-2}$) | .05 | 16.34 | .55 | .24 | 7.46 | .63 | .002 ❘ .003 | 31.61 ❘ — | .54 ❘ 1.61 | .32 ❘ .16 | — ❘ — | 1.99 ❘ .67 | the relative observations are insufficient to accurately estimate SIM(3) between two local maps. As the number of detected features increases, the integration of two maps becomes more accurate. Most NSFs which indicate the platform B are identified as features, and the global map becomes very accurate in FIG. 13 (2c).

In FIG. 10 (3a) on Experiment 3, the FI module has not recognized rendezvous yet, so a global map is not integrated. The features of B are identified from NSFs observed by the platform A, and the local maps A and B are combined into the global map (A+B) in FIG. 13 (3b). The local map C has been integrated into the global map using the identified features of C, and all the platforms can be localized in the global map (A+B+C) in FIG. 13 (3c). The platforms B and C do not observe other platforms, so there is no identified feature in images B and C.

Finally, FIG. 14 shows the integrated global map and images captured by each platform at 71 s, 121 s, and 141 s of Experiment 4. The platform A starts from the second-floor corridor and goes down the stairs to the first floor, meeting platform C in the first-floor corridor, as depicted in FIG. 8. The platform A's image in FIG. 14 (4a) shows that the features of C (green) are identified from NSFs (red) at that moment during the rendezvous $$\tau^{rdzv}_{A-C}$$

The system is evaluated in terms of the accuracy of the transformation between local maps, the number of features, and the computational load of the FI and MF modules. The translation error $e_t$, rotation error $e_r$, and scale error $e_s$ are computed as follows:

$$e_t = \text{rms}(t_{GT} - t_{Est}), \ e_s = \left\| \log\left(\frac{s_{Est}}{s_{GT}}\right)\right\| \tag{18}$$

$$e_r = \arccos\left(\frac{\text{trace}(R_{GT}R_{Est}^T) - 1}{2}\right),$$

where $e_t$ is converted to the real-world scale using the ground truth.

AM shows the best overall performance compared with the other baseline algorithms. On the contrary, LM performed the worst, even failing in Experiments 3 and 4, where the features are rarely identified, causing the MF to fail. During rendezvous, the observed platforms become moving objects in the images of the observer platforms, so the number of NSFs increases, which triggers the FI module more frequently.

In Experiments 3 and 4, which include three platforms, the actual rendezvous of Experiment 4 occurs less frequently than Experiment 3 as can be seen from FIGS. 13 and 14, so the computation load of Experiment 4 is much lighter. Similarly, in Experiment 1, the platform A observes the platform B at all times, so it takes longer computation time than Experiment 2.

Although $$\tau_{A-B}^{rdzv}$$

is longer than $$\tau_{A-C}^{rdzv}$$

in Experiment 4, the number of features of B is smaller than that of features of C. There are the following two reasons. The first reason is the smaller number of NSFs extracted from the feature-poor surface of the drone B. The second reason is that the tracking quality of NSFs is not good due to the rapid variation of the observer platform's viewpoints toward the drone B. Hence, only a few of the critical observations, i.e., well-tracked NSFs, are collected from B.

3) Inner Points: The system according to one embodiment can correctly estimate the inner points of observed platforms as shown. FIG. 15 shows the results of fitting planes using the estimated inner points in Experiments 1-3. The estimated inner points are distributed like the actual flat board shape of platform B in Experiments 1 and 2. And in Experiment 3, planes fitted using the estimated inner points well represent the cuboid shape of the platforms B and C. Since the inner points are estimated from their surfaces observed by the 4 including two observable platforms B and C, additional tests were run without either of B or C, treating the excluded platform as a dynamic obstacle. These additional tests are intended to evaluate the FI module's robustness for dynamic obstacles and for the different number of observable platforms.

FIG. 17 shows the actual and recognized rendezvous periods in Experiments 1-4 with additional robustness tests.

Based on FIG. 17, the precision, recall, and F1 scores of the recognized rendezvous are calculated in Table 4. Comparing the results of the original Experiment 3 and the additional tests, the precision of the recognition decreases in the additional tests can be observed. This is because if two or more observable platforms have similar movements while NSFs are being tracked, the identification process of features is held off until each platform's movement becomes unique, as mentioned above. In the case of the additional tests excluding B or C, the holding-off process does not take place because the number of observable platforms reduces to one. Hence, if the movements of the excluded platforms are similar to those of the remaining platforms, NSFs extracted from the excluded platforms can be identified as features. This can be alleviated using inter-platform visibility information, as described above (not applied here just to test FI only).

The recall is lower in Experiment 3 (A–C) than (A–C w/o B) of Table 4 because the holding-off process was executed in (A–C). The holding-off process provides the higher precision as mentioned before, but the process may prevent to identify features in cases where the movements of the platforms are very similar.

TABLE 4

| | Exp. I | Exp. II | Exp. III | | | | Exp. IV | | | |
| | (A-B) | (A-B) | (A-B) | (A-B w/o C) | (A-C) | (A-C w/o B) | (A-B) | (A-B w/o C) | (A-C) | (A-C wo B) |
|---|---|---|---|---|---|---|---|---|---|---|
| Precision | 1.000 | 1.000 | 1.000 | 0.983 | 1.000 | 0.967 | 1.000 | 1.000 | 1.000 | 1.000 |
| Recall | 0.896 | 0.938 | 0.865 | 0.865 | 0.731 | 0.770 | 0.505 | 0.505 | 0.809 | 0.809 |
| F1 | 0.945 | 0.968 | 0.927 | 0.920 | 0.845 | 0.857 | 0.671 | 0.671 | 0.895 | 0.895 | platform A, the actual number the planes fitted to the platforms B and C can be different depending on the observed surfaces (i.e., three and four planes to B and C, respectively, in FIG. 15). Furthermore that the camera coordinates of platforms B and C are correctly estimated just like their actual mounted position and heading (slightly look up and down, respectively).

FIG. 16 shows the estimated inner points about the platforms B and C in Experiment 4. The platforms do not have simple representative shapes such as a plane or sphere, but still, the estimated inner points of B and C are distributed like a drone and Turtlebot3, as shown in FIG. 16.

D. ROBUSTNESS

The FI module finds features that point to a specific platform among NSFs. Since the NSFs include mismatching features and dynamic features, the capability to correctly identify features among NSFs can be considered as a measure for the robustness of FI. If the FI module finds features of the platform B among NSFs of the platform A's images, it can be considered as a rendezvous where B is observed by A. Therefore, if the number of features on the image at a certain time instant is larger than the specific threshold (set to 3), it is recognized as a rendezvous. In Experiments 3 and Experiment 4 of Table 4 presents that the additional tests (w/o C) and (w/o B) show the same performance as their original experiments. Since the excluded platforms are treated as dynamic obstacles in the additional tests, this same level of the performance suggests that the proposed FI module is robust to dynamic obstacles. All the experiments show very high precision, but slightly lower recall. In particular, the low recall values of Experiment 3 (A–C) and Experiment 4 (A–B) can be attributed to the relatively poor tracking quality of NSFs on C and B, respectively.

E. SCALABILITY

Suppose that m NSFs are sent to the ground station from each platform in N platforms. Then, the FI module compares the movements of each NSF and poses of the other platforms except for the observer of the NSF; thus, the FI module is triggered mN(N−1) times. In other words, the computation time increases by the squared number of platforms. If some of the platforms succeed in MF, the relative poses of the platforms will be known. Using known relative poses, the inter-platform visibility that is, whether the other platforms have entered their image or not, can also be determined. Thus, the inter-platform visibility of identified platforms can reduce the number of FI calls by not considering the invisible platforms.

Collaborative monocular SLAM according to one embodiment is evaluated in four experiments designed to evaluate map fusion using rendezvous that are difficult to close between loops. The experiments show that the system according to one embodiment quickly and robustly recognizes the rendezvous and accurately fuses the local maps of the observer and the observed platform into the global map.

The aforementioned method of collaborative SLAM using a rendezvous may also be implemented in the form of a recording medium including computer-executable instructions, such as an application or program module executed by a computer. The computer-readable medium can be any available medium that can be accessed by a computer, and includes both volatile and non-volatile media, and removable and non-removable media. Further, the computer-readable medium may include a computer storage medium. The computer storage medium includes both volatile and non-volatile, removable and non-removable media implemented with any method or technology for storing information such as computer-readable instructions, data structures, program modules, or other data.

The aforementioned collaborative SLAM method using a rendezvous may be executed by an application installed by default on the terminal (which may include programs included in platforms or operating systems that are basically installed in the terminal), or it may be executed by an application (i.e., a program) installed by the user directly on the master terminal through an application delivery server, such as an application store server, an application or a web server associated with such a service. In this sense, the aforementioned collaborative SLAM method using rendezvous may be implemented by an application (i.e., a program) installed by default on the terminal or installed directly by the user, and recorded on a computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A collaborative visual simultaneous localization and mapping method on a multiple platform system, comprising:

estimating, by each of a plurality of platforms providing time-synchronized data associated with movement of the plurality of the platforms, a camera pose and generating a local map based on an image input through a camera in a single simultaneous localization and mapping (SLAM);

extracting, managing, and tracking non-static features from images of a dynamic object being imaged;

transmitting the camera pose, the local map and the non-static features as platform data to a ground station, which is an integrated management system;

calculating with the time-synchronized data, by the ground station, based on the platform data and utilizing the tracking of the non-static features, whether there is a rendezvous situation between one of the plurality of platforms and remaining platforms of the plurality of platforms, wherein the calculating the rendezvous situation between the one of the plurality of platforms and the remaining platforms comprises:

by identifying the one of the plurality of platforms as an observing platform, comparing a movement of the non-static features over time in the image received from the observing platform with motion of the remaining platforms based on the camera pose and local maps received from the remaining platforms, wherein the local maps include the local map transmitted by each of the remaining platforms, wherein if any of the remaining platforms have similar movements above a threshold, it is assumed to be in the rendezvous situation with the observing platform, and a non-static feature from an image of the dynamic object is matched and utilized; and if there is the rendezvous situation, fusing the local maps received from the observing platform and one or more of the remaining platforms that have rendezvoused into a global map.

2. The method of claim 1, wherein the comparing the movement of the non-static features over time in the image received from the observing platform with the motion of the remaining platforms based on the camera pose and the local maps received from the remaining platforms comprises:

designing an optimization problem; and determining that the non-static feature is an observation value that points to the platform when a convergence error of the optimization problem is small enough.

3. The method of claim 2, wherein the comparing the movement of the non-static features over time in the image received from the observing platform with the motion of the remaining platforms based on the camera pose and the local maps received from the remaining platforms comprises:

finding a convergence solution for the optimization problem by using an alternating minimization algorithm.

4. The method of claim 2, wherein the comparing the movement of the non-static features over time in the image received from the observing platform with the motion of the remaining platforms based on the camera pose and the local maps received from the remaining platforms comprises:

map fusing, by a map fusion module, by using the feature, the local maps and the pose data for the camera pose, both generated by the observing platform and an observed platform, into a global map.

5. The method of claim 4, wherein the comparing the movement of the non-static features over time in the image received from the observing platform with the motion of the remaining platforms based on the camera pose and the local maps received from the remaining platforms comprises:

estimating a similarity transformation value between the local maps to fuse into the global map.

6. A collaborative visual simultaneous localization and mapping system in which each of a plurality of platforms estimates a camera pose and generating a local map based on an image input through a camera in a single simultaneous localization and mapping (SLAM), comprising:

a ground station configured for receiving a platform data from each of a plurality of platforms providing time-synchronized data associated with movement of the plurality of the platforms, analyzing the platform data and generating a global map, wherein the ground station comprises a platform matching module configured for receiving the platform data from each of the plurality of platforms and determining, based on the platform data, whether there is a rendezvous situation between one of the plurality of platforms and remaining platforms of the plurality of platforms; and a map fusion module configured for fusing local maps received from the two or more platforms that have rendezvoused into a global map if there is the rendezvous situation, wherein each of the plurality of platforms extracts, manages, and tracks non-static features from images of a dynamic object being imaged with the movement of the platforms in order to calculate with the time-synchronized data if there is the rendezvous situation, wherein the platform data comprises the camera pose, the local map and a non-static feature from an image of the dynamic object, and wherein the platform matching module identifies one platform as an observing platform, compares a movement of the non-static feature over time in the image received from the observing platform with the motion of the remaining platforms based on the camera pose and the local maps received from the remaining platforms, and if any of the platforms have similar movements above a threshold, assumes the any of the platforms to be in the rendezvous situation with the observing platform, and matches the non-static feature.

7. The collaborative visual simultaneous localization and mapping system of claim 6, wherein the platform matching module is configured for designing an optimization problem and determining that the non-static feature is an observation value that points to the platform when a convergence error of the optimization problem is small enough.

8. The collaborative visual simultaneous localization and mapping system of claim 6, wherein the map fusion module is configured for estimating a similarity transformation value between the local maps that are generated by the observing platform and an observed platform by using the non-static feature to fuse into the global map.

9. A moving platform for performing localization and mapping, comprising:

an image input unit configured for receiving an image of a surrounding captured by a camera;

a camera pose estimation unit configured for extracting and matching a feature from the image, and estimating a camera pose from the matched feature;

a local map generation unit configured for generating a local map of an area in which the platform is located and traveled based on the image and the camera pose;

a non-static feature management unit for extracting, managing, and tracking non-static features, among the features, from images of a dynamic object being imaged by the moving platform; and a communication unit configured for transmitting time-synchronized platform data associated with movement of the platform including the camera pose, the local map and a non-static feature from an image of the dynamic object to a ground station, wherein the ground station calculates with the time-synchronized platform data, based on platform data and utilizing the tracking of the non-static features, whether there is a rendezvous situation between one of a plurality of platforms that includes the moving platform and remaining platforms of the plurality of platforms, wherein the calculating the rendezvous situation between the one of the plurality of platforms and the remaining platforms comprises:

by identifying the one of the plurality of platforms as an observing platform, comparing a movement of the non-static features over time in the image received from the observing platform with the motion of the remaining platforms based on the camera pose and local maps received from the remaining platforms, wherein if any of the remaining platforms have similar movements above a threshold, it is assumed to be in the rendezvous situation with the observing platform, and a non-static feature from an image of the dynamic object is matched and utilized.

10. The platform of claim 9, wherein the image has successive frames, wherein the non-static feature management unit tracks and manages the non-static features in the image in successive frames.

* * * * *